(12) United States Patent
Sawdon et al.

(10) Patent No.: US 7,502,801 B2
(45) Date of Patent: Mar. 10, 2009

(54) PROVIDING A SNAPSHOT OF A SUBSET OF A FILE SYSTEM

(75) Inventors: Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 11/418,619

(22) Filed: May 5, 2006

(65) Prior Publication Data

US 2006/0206536 A1    Sep. 14, 2006

Related U.S. Application Data

(62) Division of application No. 10/966,870, filed on Oct. 15, 2004, now Pat. No. 7,111,014, which is a division of application No. 10/077,129, filed on Feb. 15, 2002, now Pat. No. 6,829,617.

(51) Int. Cl.
 *G06F 17/30* (2006.01)
(52) U.S. Cl. ...................................... 707/100; 707/200
(58) Field of Classification Search ................. 707/200, 707/100
 See application file for complete search history.

(56) References Cited

U.S. PATENT DOCUMENTS 5,193,184 A    3/1993    Belsan et al.
5,210,866 A    5/1993    Milligan et al.
5,339,435 A    8/1994    Lubkin et al.
5,403,639 A    4/1995    Belsan et al.

(Continued)

FOREIGN PATENT DOCUMENTS

EP    1003103    5/2000

(Continued)

OTHER PUBLICATIONS

Prakash, Ravi et al., "Maximal Global Snapshot with Concurrent Initiators", Proceedings of the Sixth IEEE Symposium on Parallel and Distributed Processings, Oct. 26, 1994, pp. 344-351.

*Primary Examiner*—Charles Rones
*Assistant Examiner*—Yuk Ting Choi
(74) *Attorney, Agent, or Firm*—Lawrence D. Cutter; Jeffrey N. Giunta; Fleit Gibbons Gutman Bongini & Bianco P.L.

(57) ABSTRACT

A system, method and computer readable medium for providing a snapshot of a subset of a file system. A first snapshot of a first set of source files in a file system is generated. The first snapshot includes an inode corresponding to each source file in the first set of files. Stored in each inode is a first identifier associated with the first set of files and a second identifier associated with the time of the first snapshot. Next, a second snapshot of a second set of source files is taken. The second snapshot includes an inode corresponding to each source file in the second set of files. Stored in each inode are a first identifier and a second identifier. Subsequent snapshots are taken every first period and every second period for the first set of files and the second set of files, respectively.

15 Claims, 31 Drawing Sheets

U.S. PATENT DOCUMENTS

| | | | |
|---|---|---|---|
| 5,410,667 A | 4/1995 | Belsan et al. | |
| 5,678,042 A * | 10/1997 | Pisello et al. | 714/47 |
| 5,764,972 A | 6/1998 | Crouse et al. | |
| 5,784,556 A | 7/1998 | Sanchez et al. | |
| 5,790,773 A | 8/1998 | DeKoning et al. | |
| 5,819,292 A | 10/1998 | Hitz et al. | |
| 5,963,962 A * | 10/1999 | Hitz et al. | 707/202 |
| 6,023,744 A | 2/2000 | Shoroff et al. | |
| 6,026,402 A | 2/2000 | Vossen et al. | |
| 6,038,639 A | 3/2000 | O'Brien et al. | |
| 6,139,197 A | 10/2000 | Banks | |
| 6,192,518 B1 | 2/2001 | Neal | |
| 6,253,212 B1 * | 6/2001 | Loaiza et al. | 707/202 |
| 6,496,942 B1 | 12/2002 | Schoenthal et al. | |
| 6,636,879 B1 | 10/2003 | Doucette et al. | |
| 6,643,641 B1 | 11/2003 | Snyder | |
| 6,651,075 B1 | 11/2003 | Kusters et al. | |
| 6,668,264 B1 | 12/2003 | Patterson et al. | |
| 6,681,223 B1 | 1/2004 | Sundaresan | |
| 6,721,764 B2 | 4/2004 | Hitz et al. | |
| 6,748,447 B1 | 6/2004 | Basani et al. | |
| 6,748,504 B2 | 6/2004 | Sawdon et al. | |
| 2002/0169734 A1 | 11/2002 | Giel et al. | |
| 2003/0158862 A1 | 8/2003 | Eshel et al. | |
| 2003/0182330 A1 | 9/2003 | Manley et al. | |

FOREIGN PATENT DOCUMENTS

| | | |
|---|---|---|
| WO | WO00/07104 | 2/2000 |
| WO | WO02/19110 | 3/2002 |

* cited by examiner

PROVIDING A SNAPSHOT OF A SUBSET OF A FILE SYSTEM

CROSS-REFERENCE TO RELATED APPLICATIONS

This application relates to the inventors' concurrently filed and commonly assigned U.S. patent application Ser. No. 10/077,371, U.S. patent application Ser. No. 10/077,345, U.S. patent application Ser. No. 10/077,320, U.S. patent application Ser. No. 10/077,246, and U.S. patent application Ser. No. 10/077,201. All of these applications were filed on Feb. 15, 2002 and are commonly assigned to International Business Machines Corporation.

This is a divisional of application Ser. No. 10/966,870 filed Oct. 15, 2004, now U.S. Pat. No. 7,111,014, which was a divisional of application Ser. No. 10/077,129 filed Feb. 15, 2002, now U.S. Pat. No. 6,829,617. The entire disclosures of prior application Ser. No. 10/966,870 and Ser. No. 10/077,129 (now U.S. Pat. No. 6,829,617) are herein incorporated by reference.

BACKGROUND OF THE INVENTION

1. Field of the Invention

This invention relates to data storage systems and more specifically to data storage systems that store snapshots (i.e., indications of the status of stored data at particular points in time).

2. Description of Related Art

Many data storage applications store data on electromechanical systems that are prone to physical failure. Magnetic disk drives are an example of such storage systems. Magnetic disk drives utilize a rotating magnetic platter that has a read/write head suspended above but very close to the platter. Data is stored by creating a magnetic recording on the magnetic platter. Contamination on the surface of the magnetic platter often causes damage to the magnetic surface and the recording, thereby rendering the data inaccessible. Other data storage systems are subject to physical or electrical damage and may lose their data.

Many data storage systems organize stored data according to a file metaphor. In these storage systems, related data are stored in a file, and the data storage system stores multiple files. The data storage system then stores references to the multiple files in order to access the data in those files. A single file may be stored in contiguous locations in the data storage device, or the data may be stored in disparate locations. Storage of data in disparate locations in a data storage device often results when a large data file is to be stored on a device that already stores many files and the large data file must be broken up to fit in the free area of the storage device. Data is also often stored in disparate locations when additional data is added to an existing file. The assembly of stored data into files and the structure of those files on a data storage device is referred to as a file system.

Data storage systems often store images or snapshots of the data that is currently stored in the file system. The data contents of a snapshot are the data that is stored within the active file system or a previous snapshot at the time the snapshot was captured. One use of snapshots is to store the state of the file system on another storage system, such as another disk drive or magnetic tape storage system. Another use of file system snapshots is to be able to recreate data that was deleted, i.e., to access previous versions of files that have been deleted or updated.

The data stored within files in a file system have associated metadata to describe the data and allow access to the data. Some existing methods for taking snapshots of a file system defer actually copying the data in the original file system to the snapshot until the data in the original system is modified. Such systems are referred to as "Copy-on-write" systems since the data is not copied to the snapshot data until a write is performed on the original data.

Existing copy-on-write snapshot systems differ in how and when metadata is copied. Existing snapshot systems copy into the snapshot data file some or all of the metadata that describes the data file storage locations at the time the snapshot is made. These existing systems create snapshot data sets that include file references to the original data file in the original file system. This results in multiple references to the same data block in the original file system, the reference in the metadata of the original file system as well as the references in each of the snapshot data sets.

An exemplary file system data structure 400 is illustrated in FIG. 4 that contains two inodes, one in the active file system and one in a snapshot dataset, that each point to the same data block 406. The existence of multiple references to a single data block within the original file system impacts the requirements of the original file system. File systems that utilize snapshots that each store a reference to an original data block must maintain an indication of each reference to that data block in order to determine if the data block is in-use or free. Without multiple references, a single bit is able to indicate if a data block is in-use or free. With the multiple references, multiple bits are required to track the multiple references and ensure that no references exist to the data block prior to declaring the data block "free." This need to track the multiple references complicates the operation of the file system, limits the total number of snapshots, and also complicates, or renders impossible, the implementation of such snapshot system with file systems that do not support tracking multiple references to a data block.

Therefore a need exists to overcome the problems with the prior art as discussed above, and particularly for a way to more efficiently utilize system kernel memory within data processing equipment to support time sensitive processing tasks such as external data communications processing.

SUMMARY OF THE INVENTION

Briefly, in accordance with the present invention, disclosed is a system, method and computer readable medium for generating a snapshot of a subset of a file system. In an embodiment of the present invention, the method includes receiving a first snapshot for a first plurality of source files in a file system. The first snapshot includes an inode corresponding to each of the first plurality of source files and the first plurality comprises a subset of files within the file system that contains fewer than all of the files in the file system. The method also includes storing the first snapshot into a storage and storing, into the storage, an identifier associated with the first plurality of source files. The identifier stored within each inode corresponds to each of the first plurality of source files. The method further includes storing, into the storage, an identifier associated with the time of the first snapshot. The identifier stored within each inode corresponding to each of the first plurality of source files. The method also includes accepting a request for the first snapshot and providing, in response to accepting the request, the first snapshot.

In another embodiment of the present invention, a system for generating snapshots includes an input interface adapted to receive a first snapshot for a first plurality of source files in a file system. The first snapshot includes an inode corresponding to each of the first plurality of source files and the first plurality comprises a subset of files within the file system that contains fewer than all of the files in the file system. The system also includes a storage adapted to store the first snapshot in response to the input interface receiving the first snapshot. The storage is also adapted to store an identifier associated with the first plurality of source files, the identifier stored within each inode corresponding to each of the first plurality of source files and an identifier associated with a time of the first snapshot, the identifier stored within each inode corresponding to each of the first plurality of source files. The system also includes a command interface adapted to accept a request for the first snapshot; and an output interface adapted to provide, in response to the command interface accepting the request, the first snapshot.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

The present invention, according to a preferred embodiment, overcomes problems with the prior art by providing a system and method that efficiently captures snapshots of file system data and supports using those snapshots for a variety of usages. The exemplary embodiments of the present invention create snapshot data sets that utilize inferred logical references, rather than physical references, to the original data blocks.

Figure 1:
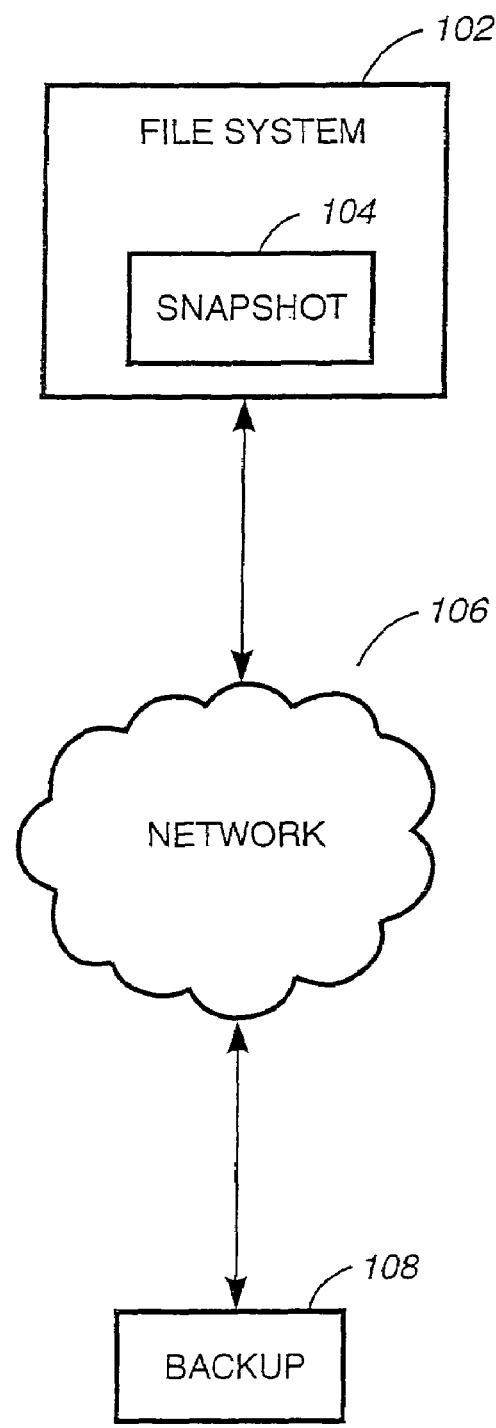
FIG. 1 is a block diagram illustrating the overall system architecture of an embodiment of the present invention.

Referring now in more detail to the drawings in which like numerals refer to like parts throughout several views, an exemplary overall system architecture 100 in which exemplary embodiments of the present invention operate is illustrated in FIG. 1. The exemplary embodiments of the present invention operate within or in conjunction with a file system 102 that is used to store one or more data files. The exemplary embodiments of the present invention capture and maintain one or more snapshot datasets 104, which are described in detail below. The computer, or client information processing system, upon which the file system 102 exists in this exemplary overall system architecture 100 is connected to other computers and data processing systems via network 106. One application for the exemplary embodiments of the present invention is to support efficient processing for backing-up data contained on a data storage system. An exemplary backup system 108 is shown in the exemplary overall system architecture 100. The exemplary backup system 108 is used to maintain a backup, which is a copy of all of the data contained within the file system 102. One use of the snapshot 104 is to efficiently communicate and store backup datasets upon remote backup systems, such as backup system 108. The snapshot data captured and maintained by the exemplary embodiments of the present invention are used for a large variety of uses beyond performing data backups. The snapshot data is used, for example, to recover accidentally deleted files or to retrieve data that has been overwritten either accidentally or intentionally.

System architecture 100 shows network 106 for connecting file system 102 with backup 108. In one embodiment of the present invention, network 106 is a circuit switched network, such as the Public Service Telephone Network (PSTN). In another embodiment of the present invention, the network 106 is a packet switched network. The packet switched network is a wide area network (WAN), such as the global Internet, a private WAN, a local area network (LAN), a telecommunications network or any combination of the above-mentioned networks. In another embodiment of the present invention, network 106 is a wired, wireless, broadcast or point-to-point. In another embodiment of the present invention, file system 102 executes on the same computer system as the computer system of backup 108.

In an embodiment of the present invention, the computer systems of file system 102 and backup 108 are one or more PCs (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems of file system 102 and backup 108 are a server such as one or more computers executing operating systems such as SunOS or AIX, such as SUN Ultra workstations running the SunOS operating system or IBM RS/6000 workstations and servers running the AIX operating system.

EXAMPLE FILE SYSTEMS AND FILE STRUCTURES

The exemplary embodiments of the present invention operate on computer systems which store data on mass storage devices. The described features of the exemplary mass storage system upon which the exemplary embodiments of the present invention operate do not, in themselves, limit the invention, and it is obvious that the teachings of the present invention are operable on data storage devices that have different features or structures than the examples provided herein.

A file system (e.g. file system 102 of FIG. 1) in the context of this specification includes a computer program that allows other application programs to store and retrieve data on storage devices such as disk drives, non-volatile memory or other data storage devices. A file in the exemplary embodiments is a named data object of arbitrary size. A file system typically allows application programs to create files and to give names to those files, to store or write data into those files, to read data from those files, to delete and to perform other operations on those files. A file structure also defines the organization of data on the storage devices. In addition to the file data itself, the file system typically contains a directory that maps file names to the data files, file metadata that contains information about the file, including the location of the file data on the storage device (i.e. which device blocks hold the file data), an allocation map that records which device blocks are currently in use to store metadata and file data, and a superblock that contains overall information about the file structure (e.g. the locations of the directory, allocation map, and other metadata structures).

The exemplary embodiments of the present invention utilize a file system that implements files and directories based upon the following metadata structures:

Inodes: metadata elements that contain file attributes (e.g., owner, access permissions, modified time, file size), and also specify the physical disk addresses of data blocks (for small files) or indirect blocks (for large files with more data blocks than the number of disk addresses that fit in an inode). In the description of the exemplary embodiments of present invention, the collection of inodes is referred to as an "node file." The exemplary embodiments store inode files as a regular file (inode plus indirect blocks), but other embodiments use different representations of the collection of inodes. The collection of some or all of the information contained within the inode is referred to as "node information."

Indirect blocks: metadata elements that contain disk addresses of data blocks or further indirect blocks (for files that are so large that they require multiple levels of indirect blocks).

Directories: metadata elements that contain directory entries that map file names to inode numbers. The exemplary embodiments of the present invention utilize directory entries that are stored in data blocks in a manner similar to the storage of other file data. The exemplary embodiments utilize metadata structures for files that store directory information that are similar to those used by other data files (inode plus indirect blocks containing disk addresses of directory blocks). Directories of the exemplary embodiments are able to contain entries that refer to other directories in order to create a hierarchical directory structure. A directory that is referred to by an entry in another directory is referred to as a subdirectory. The details of the format and other metadata for the directories are not specific to the present invention and alternative embodiments utilize other directory and metadata storage structures.

Block allocation map: a metadata structure that indicates whether each data block is free or in use (i.e., whether each data block contains data or metadata for an existing file).

Superblock: a metadata element that contains global file system configuration data. In particular, it contains information necessary for locating inodes and allocation maps.

Data Blocks: areas of file system memory that contain user data that is to be later retrieved and used by users or other applications.

Figure 2A:
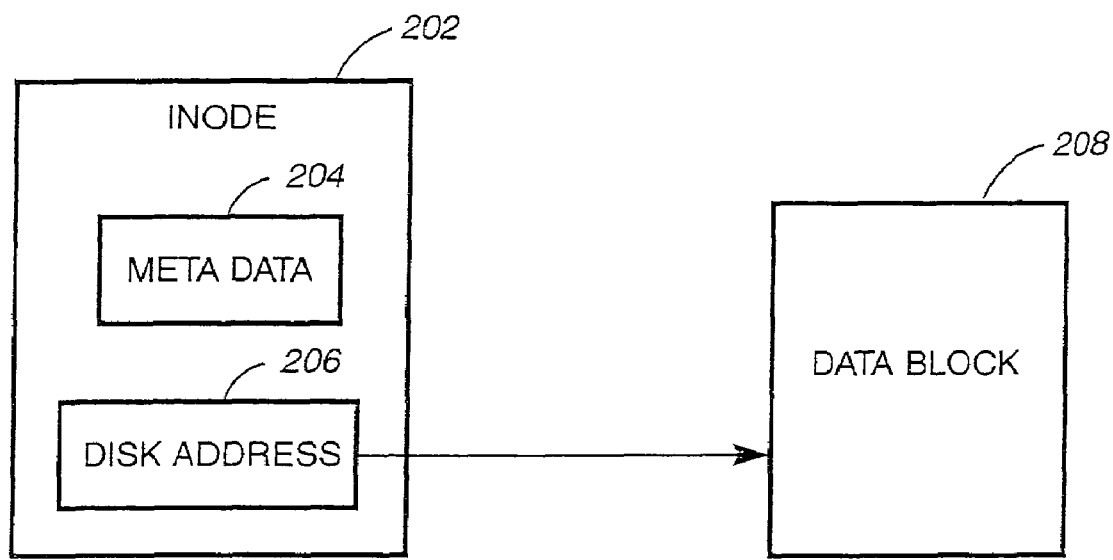
FIG. 2A is a block diagram depicting an inode and related data block, in an embodiment of the present invention.

An exemplary data structure set 200 that is associated with data stored within a file system is illustrated in FIG. 2A. Each file in the file system with which the exemplary embodiments of the present invention operates is assigned a structure that is referred to as an inode 202. The inode 202 contains metadata 204 for the file, such as the file's creation time, owner's identification, pointers to data blocks and other data that is associated with the data or data file. Each inode 202 is uniquely identified by an inode number and data within the inode is used by the file system to locate the file associated with that inode. Inodes of the exemplary embodiments do not store the user's data, nor do they store the name assigned to the file by the user. The inodes of an active file system are typically stored in a single special file, called an inode file, that is typically not visible to the user. Inodes in the file system of the exemplary embodiments are of fixed size and are stored sequentially within the inode file. An inode with a particular inode number is accessed by determining an offset amount into the inode file by multiplying the inode number by the length of each inode and then reading the data structure in the inode file that is offset by that calculated value.

The inode 202 further contains a disk address 206 that is a pointer to the data block 208. The disk address data 206 in the exemplary embodiments that are contained within inodes 202 and that point to the data blocks 208 contain the disk addresses for those data blocks 208. The disk address data 206 are able to specify an identification of the specific disk drive as well as a sector or block within that disk drive which contains the data block 208.

Figure 2B:
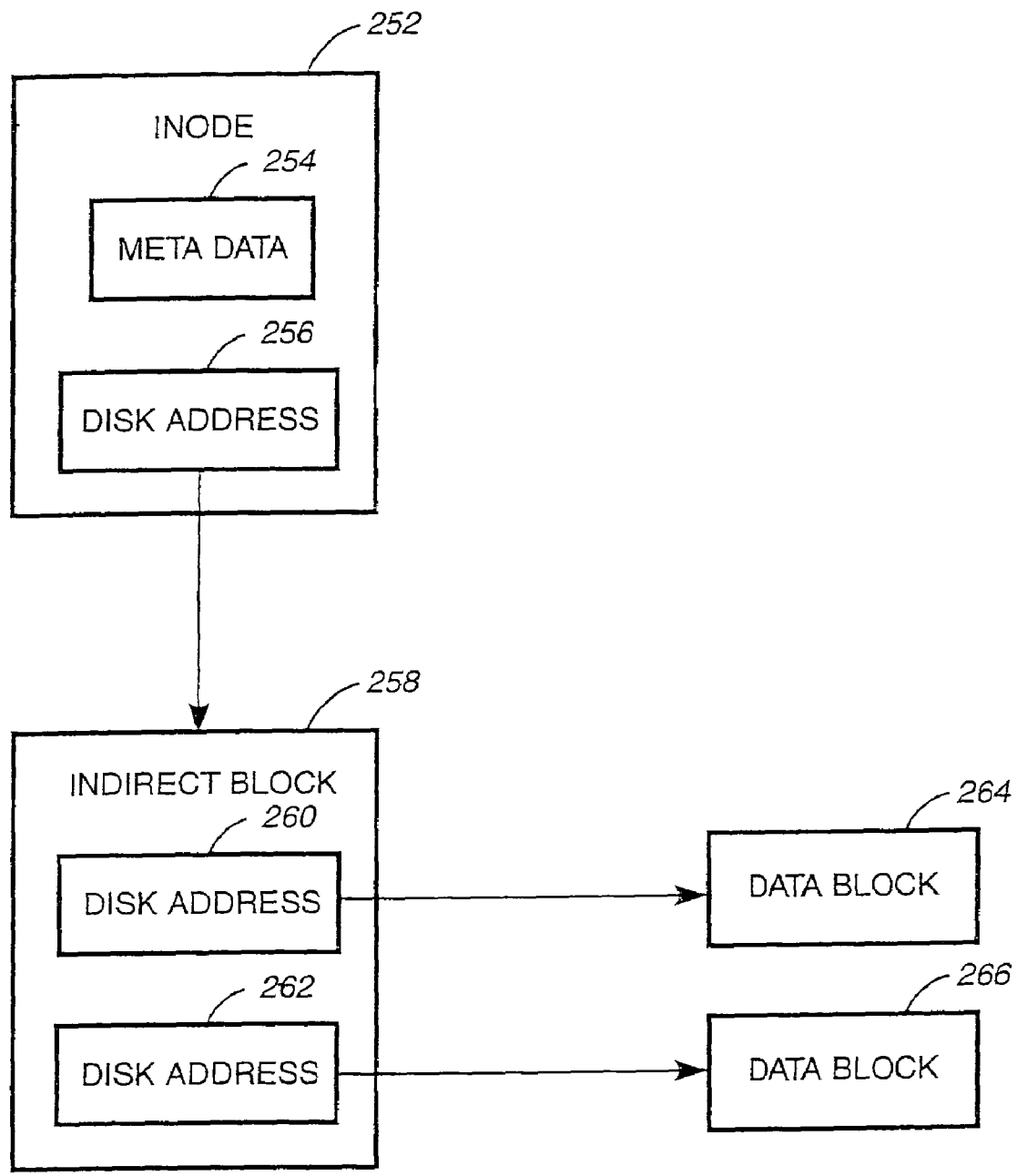
FIG. 2B is a block diagram depicting an inode and related indirect block and data blocks, in an embodiment of the present invention.

FIG. 2B illustrates a second exemplary data structure set 250 that describes data files within the file system that is used in conjunction with the exemplary embodiments of the present invention. The exemplary set 200 of data structures is used for small files where the disk address data 206 is able to be stored within the inode itself. The second exemplary set 250 of data structures is used for larger files, where the disk address data 256 of inode 252 stores pointers to one or more indirect blocks 258 that each contain one or more pointers, such as the indirect block first disk address 260 and indirect block second disk address 262, that point to either the data blocks, such as first data block 264 and second data block 266, or to other indirect blocks that contain further disk addressing information.

Figure 3:
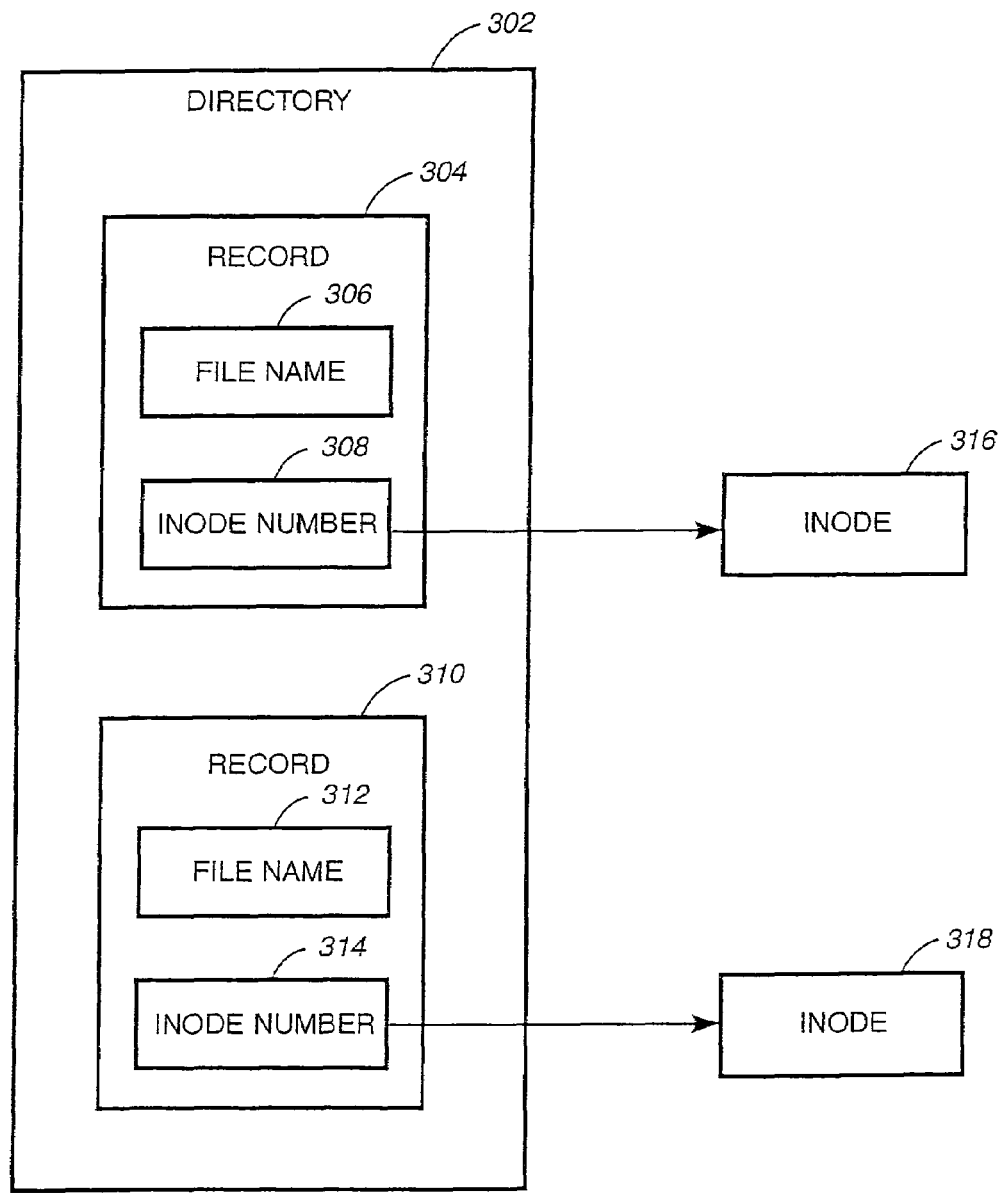
FIG. 3 is a block diagram depicting a directory and related structure, in an embodiment of the present invention.
Figure 4:
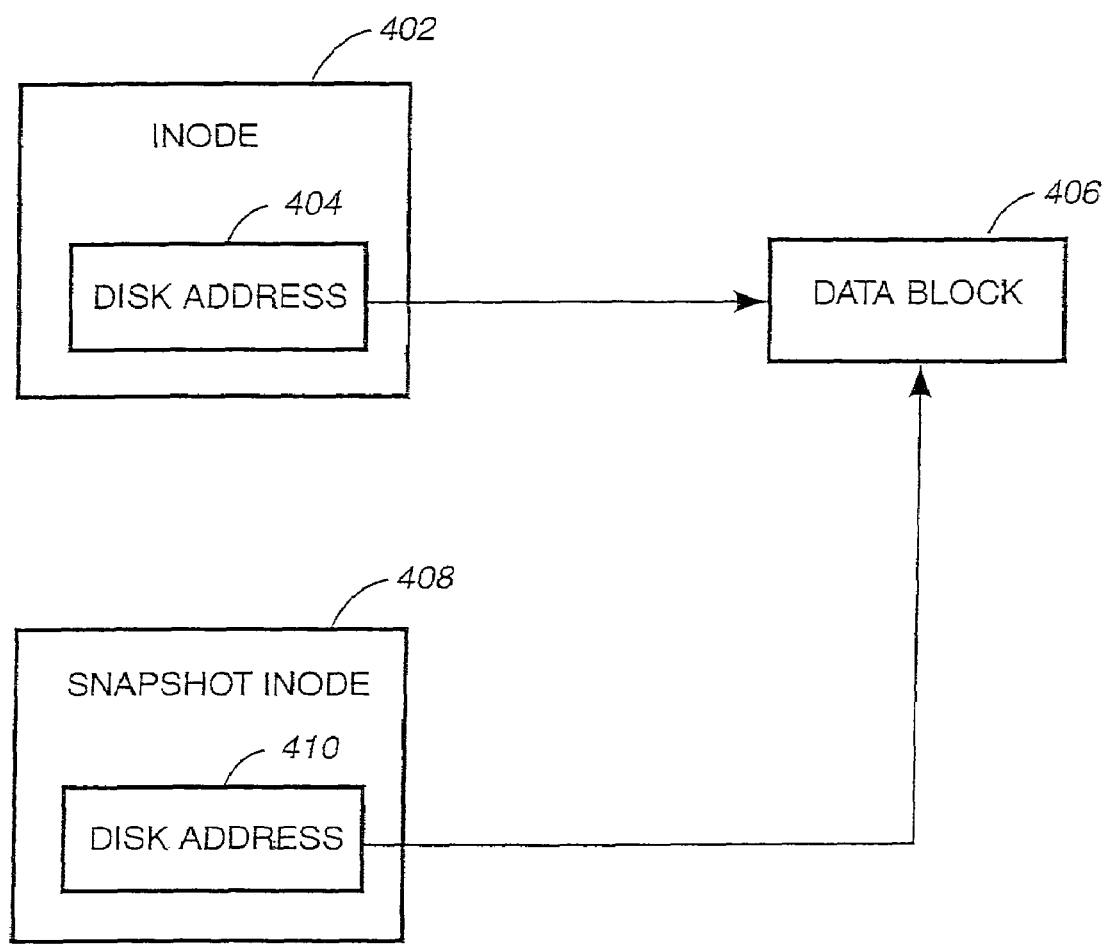
FIG. 4 is a block diagram depicting more than one inode containing the same disk address.

The name assigned by the user to the file in the file systems used in conjunction with exemplary embodiments of the present invention is stored in a special type of file called a directory. An exemplary file system directory structure is illustrated in FIG. 3. The exemplary directory structure 300 is shown to contain two directory entries, or records, the first directory record 304 and the second directory record 310. Directories used by the exemplary embodiments are able to contain a large number of directory entries. The structures associated with the first directory record 304 will be described herein, and other directory records, including directory record 310, are similar.

The data for the first directory record 304 contains a file name 306 and inode number 308. The directories 302 are managed by the file system and the record 304 maps the user assigned file name 306 to the inode number 308 that uniquely identifies the inode 316 for the file associated with this directory entry 304. These directory entries are sometimes referred to as links in the exemplary embodiments. The links in these embodiments point to user files, other directories, or other file system objects not described herein. The directories of the exemplary embodiments impose a hierarchical naming structure over the files in the file system. The root of the hierarchy is the root directory of the file system. Files and directories within the file system are accessible from the root directory or a subdirectory from the root. A file is able to have more than one directory entry, and thus more than one name, for the user to access it.

The file system also defines the structure of the data that is stored on one or more mass storage devices. Many file systems support concurrently creating, modifying and deleting multiple files. Such file systems are desired to be link and write consistent. A file system is said to be link consistent if every file has at least one directory entry and every directory entry links to the same file as it did when the link was created. Furthermore, write consistent file system maintain the order of ordered writes within a single file or between files. For example, an application that writes to a second file after writing to a first file and forcing the written data in that first file to be written to non-volatile storage requires the data to be present in the second file only if there is data in the first file. A file system that maintains this property is said to be write consistent.

File System Snapshots

The exemplary embodiments of the present invention capture one or more snapshots of a file system to create a data set that preserves the state of data that was stored within that file system at the time the snapshot was captured. It is desirable to create and capture snapshots that include all files in a file system in order to maintain a consistent file system image and efficiently copy the old data in the file system prior to modification after capturing the snapshot.

The snapshots of the exemplary embodiments are maintained after the snapshot is initially captured. After a snapshot is captured, modifications to the active file system are augmented by snapshot maintenance processing. When data within the active file system is first modified after a snapshot is captured, the processing of the exemplary embodiments copies the original version of that data, i.e., the version of the data that existed at the time of the snapshot, into the snapshot dataset prior to modifying that data within the original file. The operation of this system results in the storage required for the contents of the snapshot growing over time as files within the active file system are modified.

Figure 5:
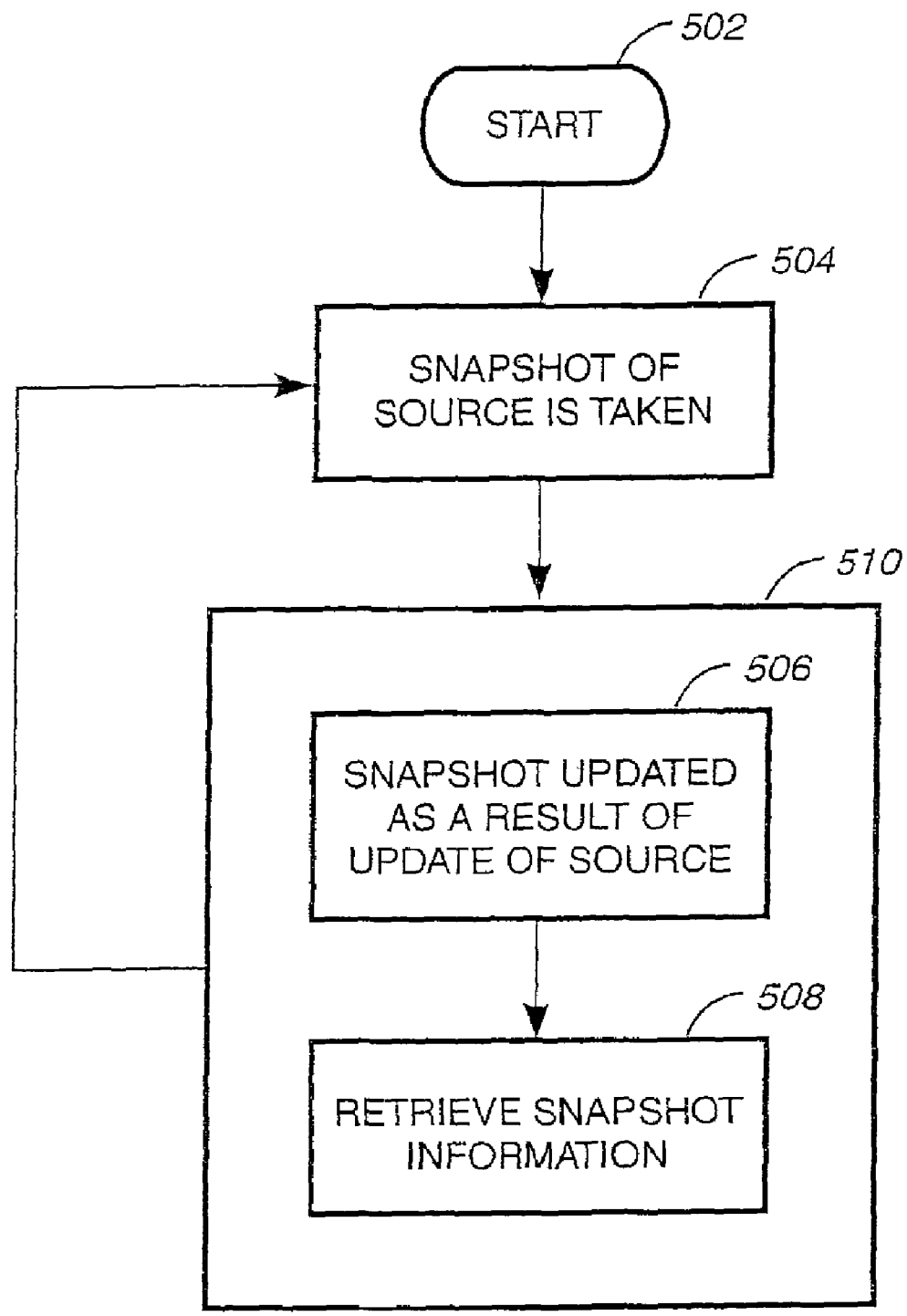
FIG. 5 is a flowchart depicting the overall operation and control flow of one embodiment of the present invention.

The overall processing and control flow 500 of an exemplary embodiment of the present invention is illustrated in FIG. 5. Control flow 500 begins with step 502 and flows directly to step 504. In the operation of an exemplary embodiment of the present invention, a snapshot is initially captured, at step 504, in order to capture the status of the file system at that time. Once the snapshot is captured, processing advances to a snapshot maintenance procedure, at step 510, wherein the snapshot that was captured is either updated, at step 506, due to updates within the active file system, or data from the snapshot is retrieved, at step 508, in response to a request by a user or process for data that is stored within the snapshot data set. Subsequently, control flows back to step 504 as later snapshots are taken and maintained.

Figure 6A:
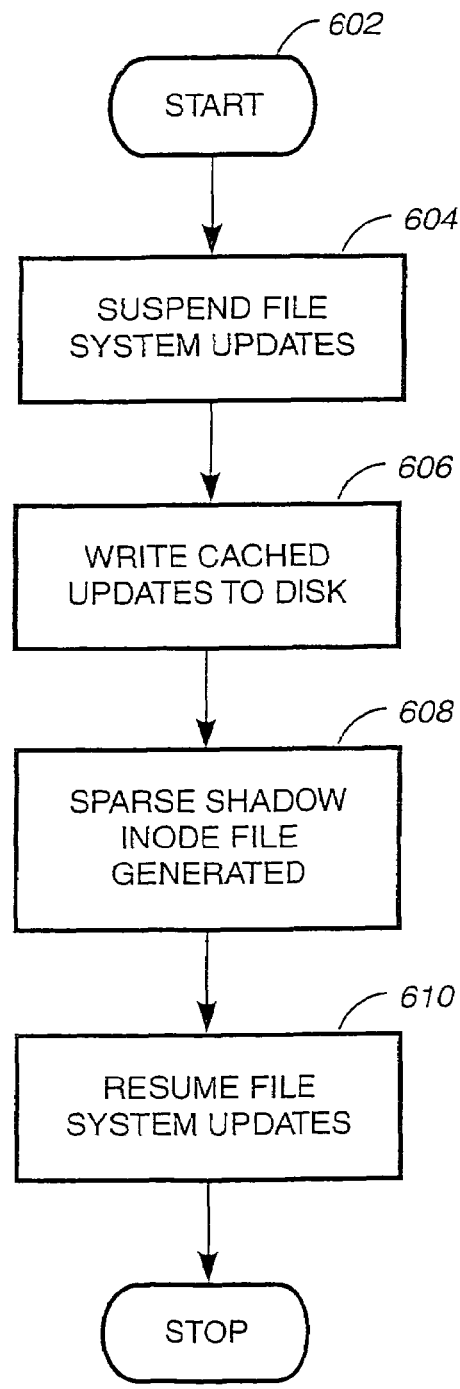
FIG. 6A is a flowchart depicting the operation and control flow of the snapshot generation process, in one embodiment of the present invention.

The snapshot capture processing and control flow 600 of exemplary embodiments of the present invention is illustrated in FIG. 6A. Control flow 600 begins, at step 602, and flows directly to suspending, at step 604, updates to the active file system. Prior to creating a snapshot, the processing of the exemplary embodiments brings the file system to a quiescent state by deferring future updates to files and directories in the file system and waiting for pending updates to finish. After updates to the file system have been deferred, the processing writes, at step 606, the cached data updates to the file system in order to ensure that all data is stored on the file system and that interruptions in operations (e.g., an interruption in power) does not unduly corrupt the data within the file system. After the data is written to the file system, the actual snapshot is created by establishing an inode for the shadow inode file, at step 608, and recording the existence of that snapshot in the file system superblock.

The shadow inode file created in the exemplary embodiments resides on the original file system and is created and otherwise accessed as is any other file. The sparse shadow inode file of the exemplary embodiments is created by establishing an inode for the shadow inode file that is associated with the snapshot. The creation of a snapshot in the example embodiments of the present invention does not involve the allocation of data blocks for either the shadow inode file or for other elements of the snapshot dataset. The inode that is established upon snapshot capture for the shadow inode file reflects that the shadow inode file has the same length as the inode file of the inode file of the active file system, but the disk addresses contained within this inode are all equal to the NULL value (i.e., they are equal to zero). The use of NULL values for disk addresses within the inode of the shadow inode file indicates that the data blocks for the shadow inode have not been allocated. This characteristic allows a snapshot to be captured by simply establishing the inode for the snapshot data file without allocating data blocks on the file system.

The sparse inode file is therefore generated in a process that requires few disk write operations because creating a large, completely sparse file (the newly created, sparse inode file contains no data and is in effect only "reserved" space for future use) only requires writing its inode. The sparse shadow inode file of the exemplary embodiments initially contains all null values. The existence of a particular inode data within the snapshot inode file is determined by identifying if the inode data consists entirely of null values. If an inode data structure of the snapshot dataset contains non-null values, then valid inode data is assumed to exist in that block. The location of the inode for the shadow inode file itself is then recorded in the superblock to create a record of that snapshot and support subsequent processing.

After the superblock is updated by storing the location of the inode that references the shadow inode file of the just captured snapshot, normal file system activity for the original data file system resumes, at step 610. Deferred updates are processed and applications are again able to access the original file system data. Access to the file system in the exemplary embodiments of the present invention is advantageously blocked for only the short period needed to accomplish the above tasks. Prior to finalizing the snapshot creation, all dirty data and metadata is, flushed to the original file system through the conventional process of flushing the disk cache associated with files being captured by the snapshot. This ensures that a subsequent failure (e.g., power loss) does not cause the state of the file system recorded in the snapshot (which is initially stored as the original data files, as is described below) to suddenly change.

Figure 7A:
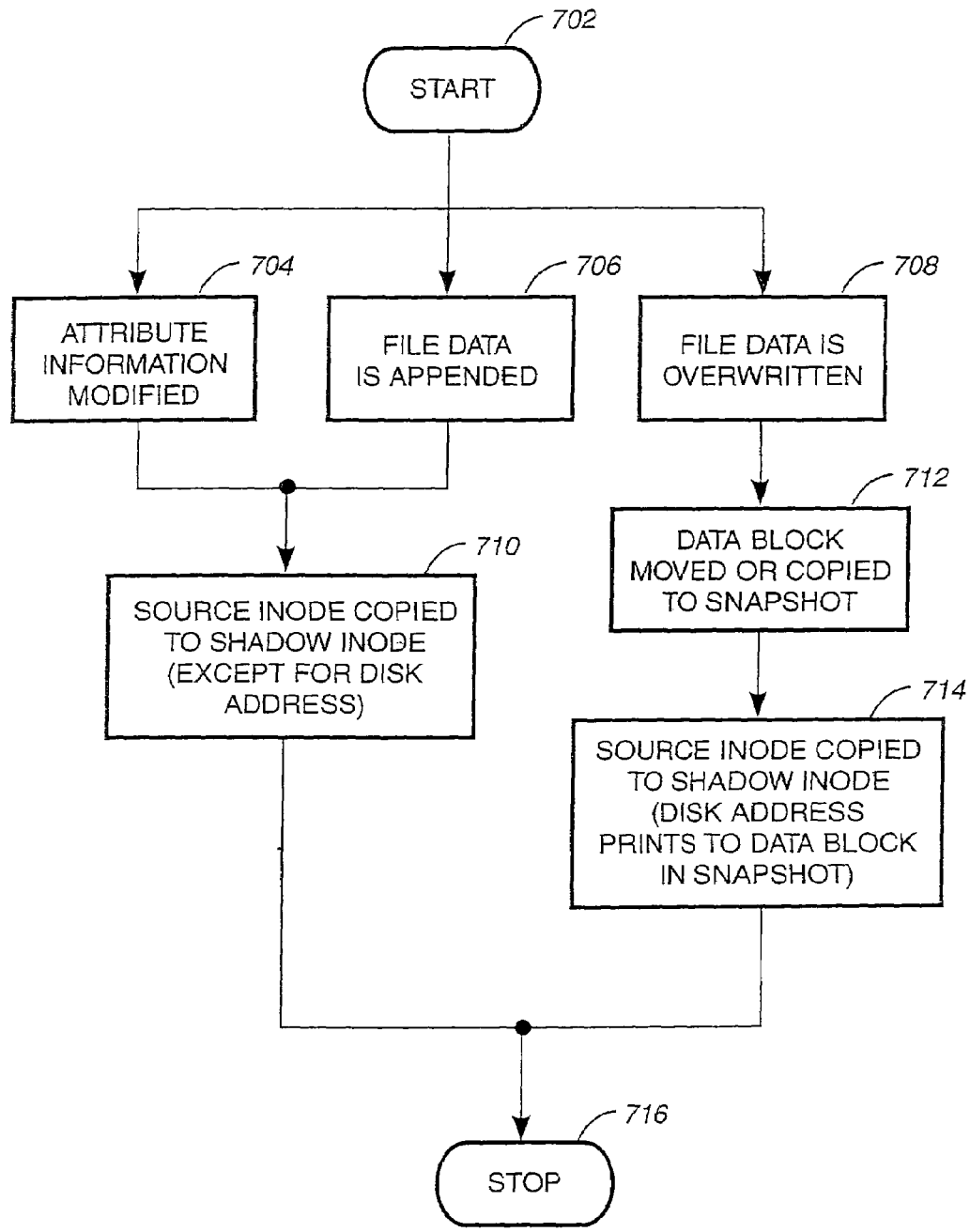
FIG. 7A is a flowchart depicting the operation and control flow of the snapshot update process, in one embodiment of the present invention.

Original file system updates are able to be categorized into several different types. The processing of the exemplary embodiments to update the file system after a snapshot has been captured and exists is described below for the different types of updates that are performed in the exemplary embodiments. The exemplary embodiments perform the processing described below to affect changes in the snapshot dataset prior to performing updates to the original file system via conventional processing. The snapshot update process operation processing and control flow 700 for exemplary embodiments of the present invention is illustrated in FIG. 7A. Control flow 700 begins with step 702 and flows directly to any of steps 704, 706 or 708. Upon an update to the file of the active file system, the processing of the exemplary embodiment enters the snapshot update process 700 and the processing to be performed is determined by the type of update being performed upon the active file system.

The snapshot update processing 700 determines, at step 704, if only the inode information of the original file is to be updated in this iteration. The updating of file attribute changes (e.g., changing file ownership or permissions via the Unix commands chown or chmod) within the file system are conventionally performed by only updating the relevant metadata that is contained within the inode of the file. If this is the first change to the inode since the snapshot was created, the exemplary embodiments of the present invention first save, i.e., copy, a copy of the original inode content, at step 710, into the shadow inode file prior to updating the inode of the original file system. This operation fills in a portion of the sparse region within the shadow inode file with the data from the inode of the file being updated. The inode copy within the snapshot inode file has the same effective inode number as the original inode because the exemplary embodiments store the snapshot inode at the same offset within the shadow inode file as the original inode is stored within the inode file maintained by the file system. File attributes from the original inode are copied as-is, but the disk address within the shadow inode stored in the snapshot inode file is replaced with a "ditto" value referred to herein as a ditto disk address.

A ditto values in the exemplary embodiments is a reserved value that indicate that the disk address value is not a real disk address and additional processing is required to access the data, as is described below. In the exemplary embodiments, "ditto" values for disk addresses are stored as "−1." Since −1 is not a valid disk block address, the processing realizes that this is a ditto value and requires specialized processing to retrieve the user data, as is described below. Once the original inode data is copied into the shadow snapshot inode file within the snapshot dataset, the snapshot update processing terminates, at step 716, and the original inode, the inode in the active file system in this example, is updated normally.

The exemplary embodiments utilize specialized processing to overwrite or delete data in a file. The processing of the exemplary embodiments of the present invention that deletes data in a file, including deletion of the entire file, is similar to the processing used to overwrite the file. The following description of the processing of the exemplary embodiment that overwrites data within a data file also describes the processing used to delete data within a file with the obvious differences realized by those skilled in the relevant arts. This processing is used for file overwrite operations that include overwriting either part or all of a data file's contents. If the update to the original data file is to overwrite user data within the original file, the snapshot update processing determines, at step 708, that data within the original file is to be overwritten. The processing then moves or copies, at step 712, the data from the original data file into the snapshot data set. The inode within the snapshot inode file is then updated, at step 714, to contain the original file inode, with the disk address portion of the inode referencing the data block that was moved or copied into the snapshot data set.

If an operation to the original data block overwrites a whole data block, some embodiments of the present invention do not copy the data to a new disk block prior to being updated. These embodiments move the old disk block into the snapshot dataset by storing the disk address of the original data block into the indirect block stored in the snapshot dataset and replacing the address in the indirect block of the original file with the address of a newly allocated data block. This saves the disk I/O associated with copying the original data from the original data block into the snapshot dataset when the original file will no longer need the original data.

Updating data that is in a currently active file within the active file system after that file has been captured in a snapshot is performed by one of several algorithms in the exemplary embodiments depending upon the type of update that is required. If the update is the first update to a particular data block in the given file of the original file system since the snapshot was created, a copy of the original data block is first copied into the snapshot dataset. If the inode and selected indirect blocks of the original file have not already been copied into the snapshot dataset by a previously executed operation, those metadata elements are first copied into the snapshot dataset. If the inode has not been previously copied, the inode is copied to the shadow inode file as described for attribute changes above.

The existence of inode data within a shadow inode file within a snapshot dataset is determined in the exemplary embodiment by determining if the inode record contains null values. If the file is large enough to have indirect blocks, the indirect block pointing to the data block being updated is also copied to the snapshot dataset. The exemplary embodiments copy these metadata elements by allocating a new indirect block in the snapshot dataset, filling the indirect block with "ditto" disk addresses and then storing the address of the new (snapshot) indirect block into the snapshot inode (thereby replacing the "ditto" disk address that was stored when the inode was copied from the original into the shadow inode file). If the file has multiple levels of indirect blocks, the process is repeated for each indirect block in the chain of indirect blocks that lead from the inode to the data block being updated. If some or all of the affected indirect blocks have already been copied into the snapshot dataset during a previous update, these indirect blocks do not need to be updated in the snapshot dataset.

Following the update of the inode and any indirect blocks associated with an updated data block, the data block being updated is then copied into the snapshot dataset by allocating a new disk block, copying the data from the old block into the new block and storing the disk address of the new block into the indirect block that was copied into the snapshot dataset (thereby replacing the "ditto" disk address that was stored in the indirect block when the indirect block was copied from the original file into the snapshot dataset). After the data block has been copied into the snapshot dataset, the data block in the original file is updated normally.

Another type of data file updating is appending data to an existing file. The snapshot update processing control flow 700 determines, at step 706, if the update to the original data file consists of a file append operation that is to result in appending data to the original data file. The processing of the exemplary embodiment of the present invention that is associated with appending data to a file is similar to the processing performed to update a data block: the inode of the original file is first copied, at step 710, to the shadow inode file for the snapshot dataset, thus saving a copy of the old file size and data modified time. In the case of appending data to a file, however, no data in the existing data file is overwritten and therefore there is no need to copy any data or indirect blocks into the snapshot dataset.

A further type of data file updating is truncating a data file, which is often performed in the course of clearing or deleting a file. The processing associated with these file updates is similar to the processing used when updating a whole data block. These processes include first copying the data that is to be cleared or deleted to the snapshot dataset, then copying the inode and selected indirect blocks as necessary under the processing described for updating a data block. After the data block, inode and any indirect blocks have been copied into the snapshot dataset, the operation upon the original file can then proceed normally.

Some embodiments of the present invention implement an optimization of operations that clear or delete whole data blocks. These embodiments implement an optimization that is similar to the processing used by some embodiments when overwriting a whole data block. These embodiments perform the operations of clearing or deleting of whole data blocks by moving the data block to be cleared or deleted from the original data file into the snapshot dataset and replacing the original file metadata with a null disk address. Some of these other embodiments further optimize the processing to clear or delete a data block by identifying that the entire content of an indirect block references all or part of the entire range of data to be deleted or cleared. These embodiments move the whole indirect block of the original file, by copying the disk address of the indirect block, into the inode or higher level indirect block of the snapshot dataset. As a particular example, these embodiments implement truncating a file to zero length or deleting a file that has not been updated since the snapshot was captured by only copying the disk addresses from the original inode into the shadow inode within the snapshot inode file of the snapshot dataset.

The processing of the exemplary embodiments to implement directory updates is similar to the processing for updating data blocks. The directory information is first copied into the snapshot dataset and then the inode and selected indirect blocks are copied, if necessary, as described for the processing of updating data blocks.

The snapshot processing of the exemplary embodiments of the present invention support other file system management operations, including growing, shrinking, or otherwise re-organizing a file system. These other operations involve the movement of existing data and metadata to different disk locations. The General Parallel File System (GPFS) such as those available from IBM, for example, stripes data and metadata across multiple disks and supports operations that remove one or more disks from an existing file system or that add disks and rebalance the existing data across all of the available disks. These are examples of operations that involve moving data and/or metadata from one disk to another. These operations are able to operate on the original and the snapshot data independently because they do not change the content of a file. The exemplary embodiments of the present invention implement these operations by first processing the original files and then processing all of the snapshot datasets. In the processing of these operations, a "ditto" disk address is treated as a null address, i.e., no action is necessary if a "ditto" address is found.

Reading Data Contained within Snapshot

Embodiments of the present invention allow users or other processes to read and modify data that has been captured within a snapshot. Reading and modifying data within a snapshot allows the use of data that existed at the time of the snapshot to be used directly, without restoring the data within the snapshot to an active file system.

Figure 8A:
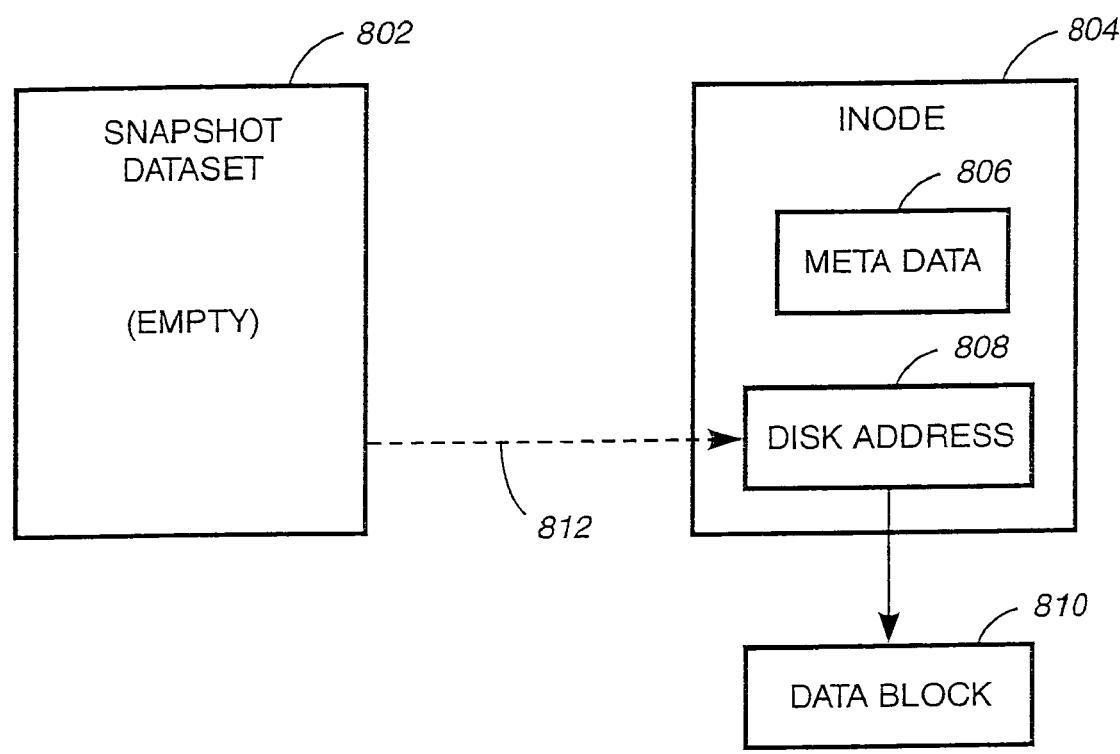
FIG. 8A is a block diagram depicting the structure of a snapshot upon generation, in an embodiment of the present invention.

A schematic diagram illustrating an initial snapshot dataset structure 800 according to an exemplary embodiment of the present invention is illustrated in FIG. 8A. The snapshot dataset 802 in this example is shown to be empty and represents a snapshot where the original file system has not been updated since the snapshot was captured. The processing used to retrieve data from a snapshot dataset, as is more fully described below, first examines the inode file of the snapshot to determine if valid inode data exists within the snapshot dataset 802 for the data file being retrieved. The absence of inode data within the snapshot dataset 802 signifies to the processing of this exemplary embodiment that the requested data has not been modified since the snapshot was captured and that the requested data "within" that snapshot is in the original data file of the active file system. This results in the processing that is performed by these exemplary embodiments inferring an inferred reference 812 to the inode 804 of the active file system in order to access the requested data block.

When the exemplary embodiments of the present invention attempt to access a data block 810 within a captured snapshot but the snapshot dataset does not contain data for the inode associated with the requested data file, the processing of the exemplary embodiments accesses the data block by using the disk address 808 in the inode 804 of the active file system. The processing of the exemplary embodiments similarly access metadata for a file if there is no valid inode data within the snapshot dataset 802 by an inferred reference to metadata 806 within the inode 804 of the active file system.

Figure 8B:
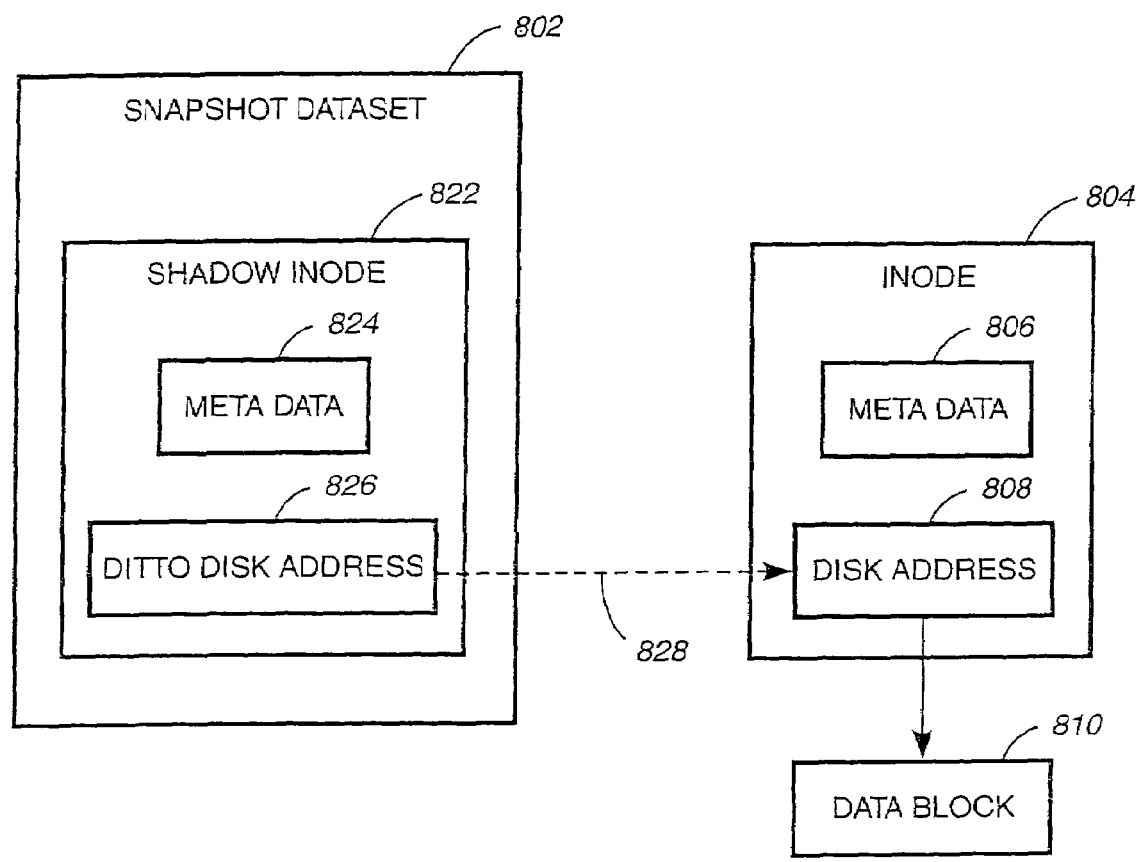
FIG. 8B is a block diagram depicting the structure of a shadow inode upon attribute modification of the corresponding source file, in an embodiment of the present invention.

An updated attribute data structure 820 of an exemplary embodiment of the present invention is illustrated in FIG. 8B. In this updated attribute data structure 820, a shadow inode 822 is stored within the snapshot dataset 802. The shadow inode 822 represents an inode of a data file that was captured into the snapshot dataset 802 but the attributes, i.e., metadata 824, have been changed since the snapshot was captured. The processing described above has copied the inode data from the active file system into the snapshot dataset 802 prior to updating the inode metadata within the active file system. This structure results in the shadow inode 822 containing the metadata present in the associated file that was present when the snapshot was captured.

As described above, the disk address 826 of this shadow inode contains a "ditto" value, a "−1" value in the exemplary embodiments, to indicate that this is a shadow inode and that the true disk address for the actual data block 810 is stored in the inode 804 of the active file system. The ditto value stored in the disk address 826 signifies an inferred reference 828 to the processing of the exemplary embodiments that indicates that the processing is to retrieve the actual disk address for the data block 810, which is still part of the original file in this scenario, using the disk address 808 within the inode 804 of the active file system.

Figure 8C:
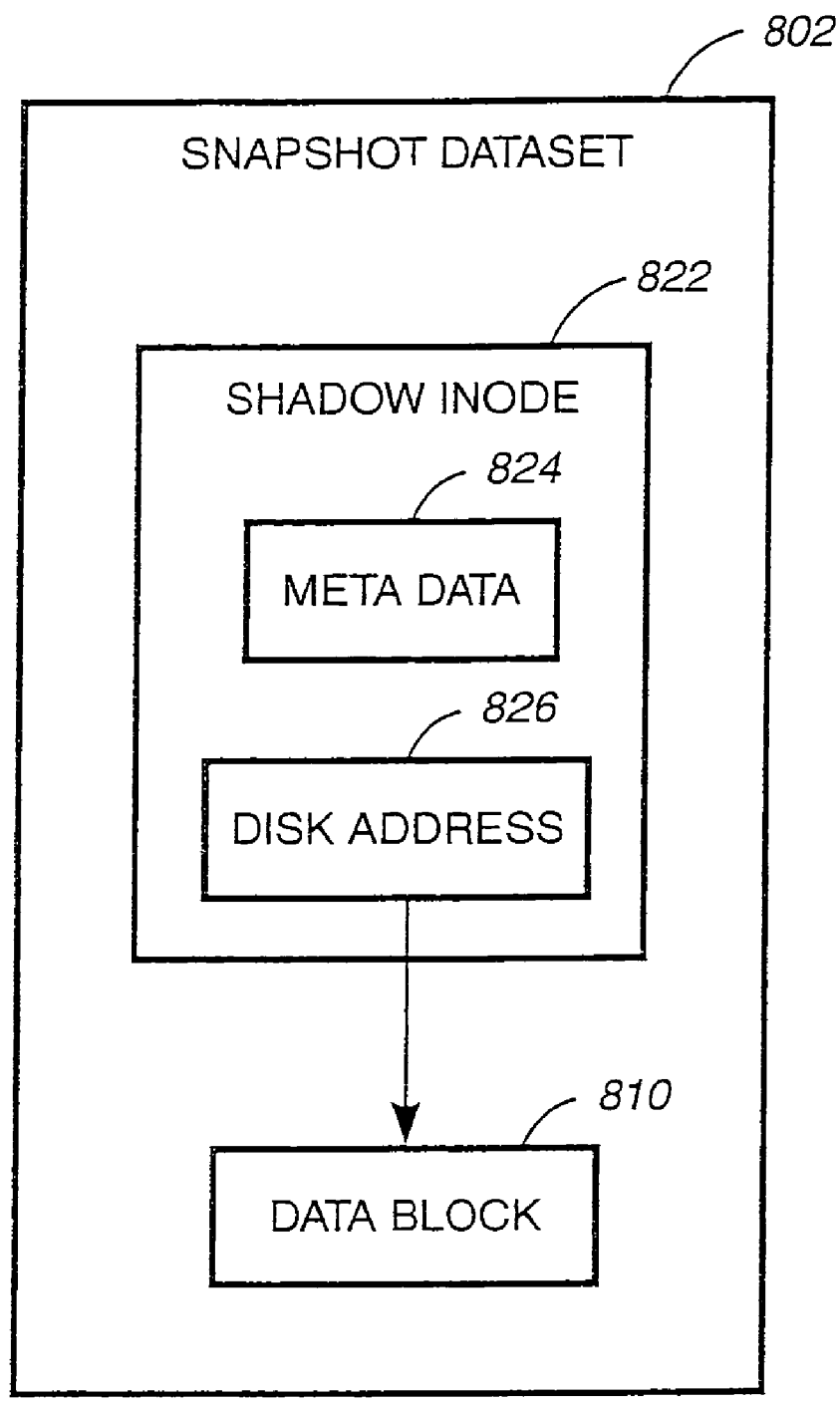
FIG. 8C is a block diagram depicting the structure of a shadow inode upon overwrite of the corresponding source file, in an embodiment of the present invention.

An updated data block storage data structure 830 of an exemplary embodiment of the present invention is illustrated in FIG. 8C. The updated data block storage data structure 830 represents the data block 810 that has been updated since the snapshot was captured. The processing of the exemplary embodiments, as described above, moved or copied to snapshot dataset 802 the data block 810 that was in the active file system prior to updating of that data block after the snapshot was captured. The updated data block storage data structure 830 illustrates that the shadow inode 822 within the snapshot dataset 802 contains not only valid metadata 824 but a valid disk address 826. The disk address 826 indicates the storage location of the data block 810, which is now part of the snapshot dataset 802.

Figure 8D:
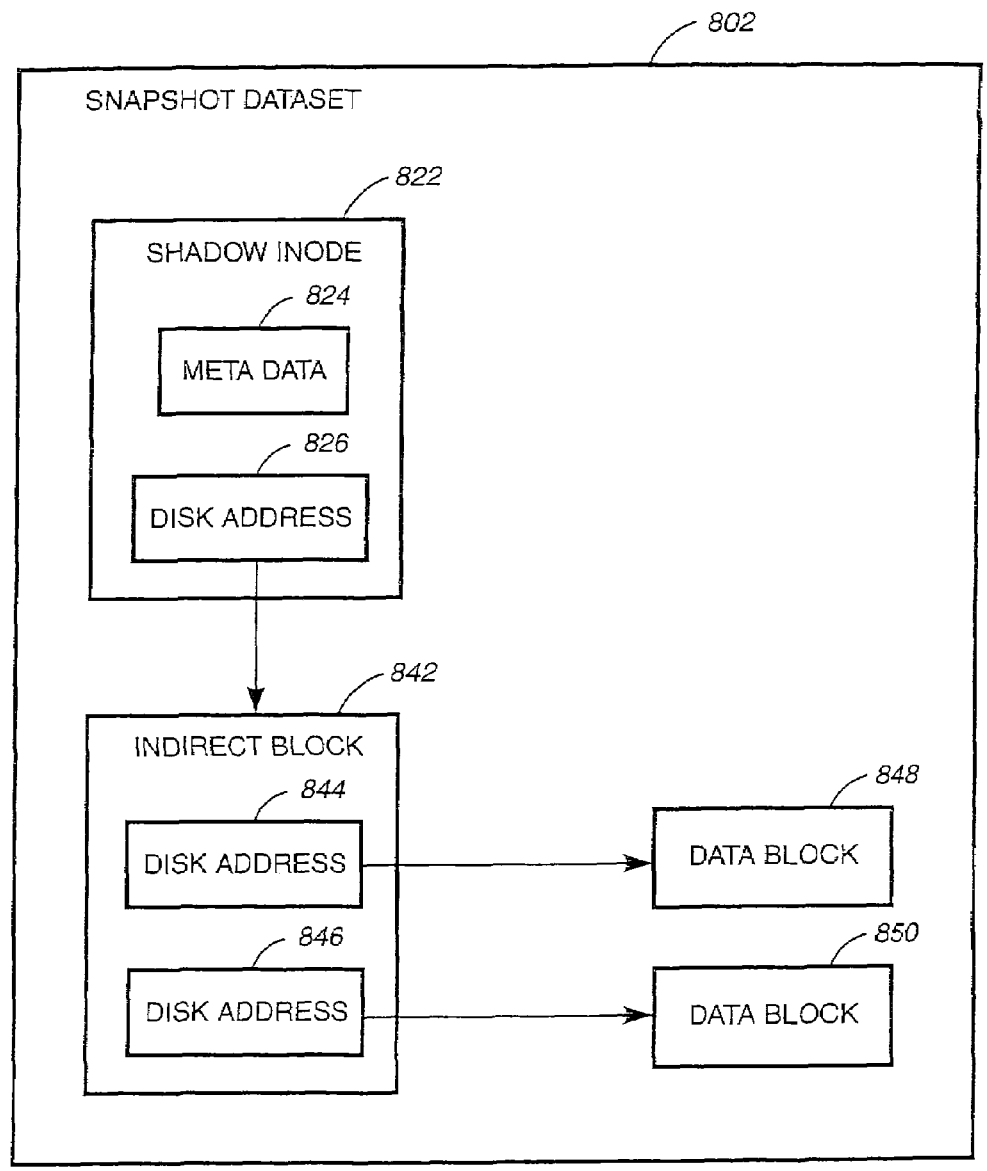
FIG. 8D is a block diagram depicting the structure of a shadow inode upon overwrite of the corresponding source file, including the related indirect block and data blocks, in an embodiment of the present invention.

An indirect block storage data structure 840 of an exemplary embodiment of the present invention is illustrated in FIG. 8D. The snapshot dataset 802 in this case contains the shadow inode 822, which has the metadata 824 of the originally captured data file and a valid disk address 826, wherein the disk address 826 stores the location of an indirect block 842 that is associated with a large data file. The indirect block 842 of this example is shown to contain two disk addresses, first disk address 844 and second disk address 846, that point to data blocks, the first data block 848 and the second data block 850, that are part of the file contained within the snapshot dataset 802. In this example, the two illustrated data blocks have been moved within the snapshot dataset 802.

If an inode for the given file is not within the snapshot dataset, that indicates that the file has not been changed since the snapshot was captured and the operation reads the current data file by accessing the data stored in the original file instead. If an inode for the requested file is in the snapshot dataset, the operations proceeds as a conventional read operation using the inode of the snapshot dataset, except that whenever a "ditto" disk address is encountered in the snapshot dataset, the corresponding data block (the block with the same logical block number as is stored within the inode) is read from the original file instead (if the snapshot is not part of a snapshot chain of multiple snapshots as is described below).

Figure 9:
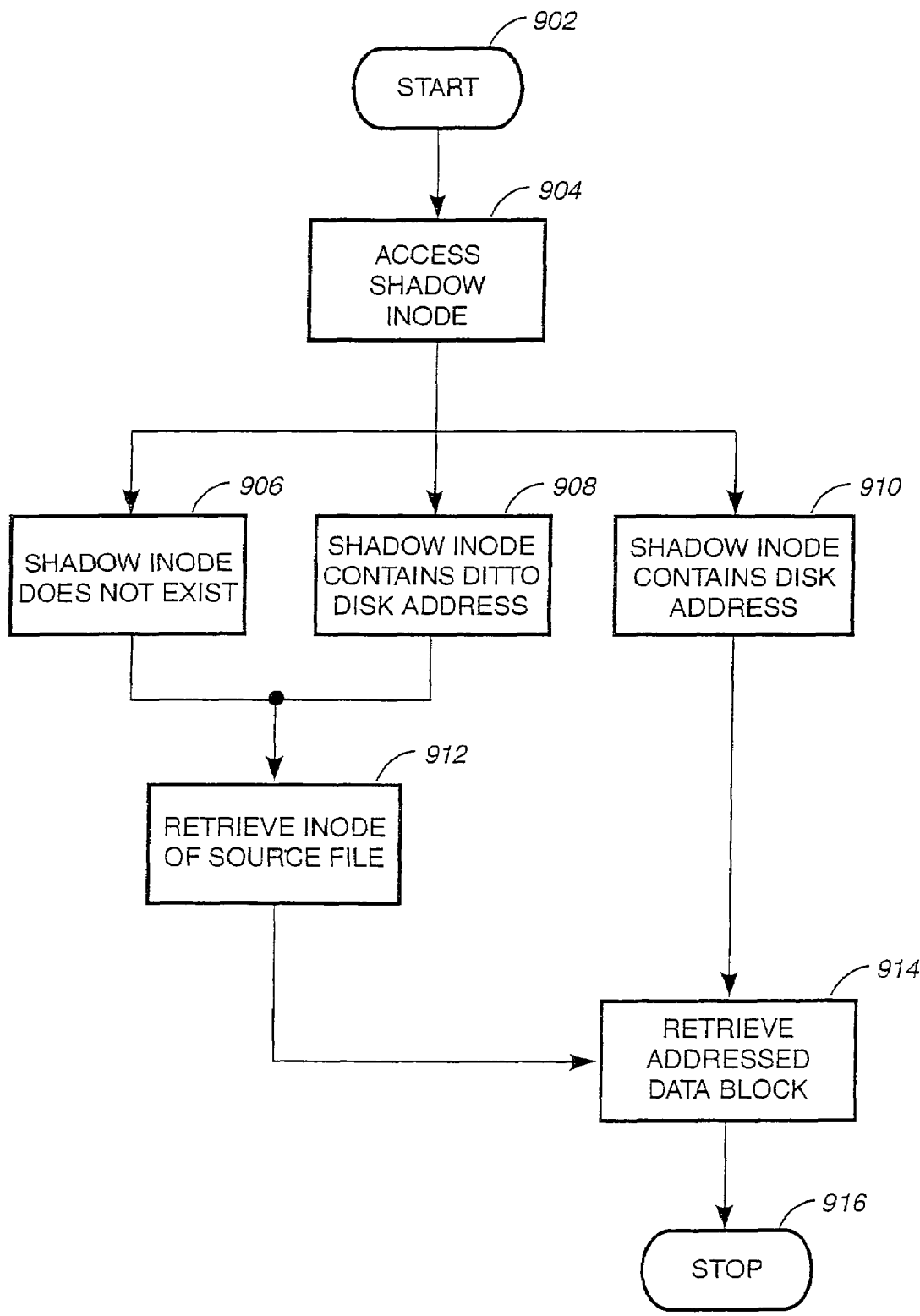
FIG. 9 is a flowchart depicting the operation and control flow of the snapshot retrieval process, in one embodiment of the present invention.

The data file read processing 900 for an exemplary embodiment that has captured a single snapshot is illustrated in FIG. 9. Control flow 900 begins with step 902 and flows directly to step 904. Upon a request to read a data file from a snapshot dataset, the data file read processing control flow 900 initially accesses, at step 904, the shadow inode within the snapshot dataset. In response to accessing the inode data within the snapshot dataset, one of three results are possible in this exemplary embodiment and specialized processing is performed in each of these three cases. The processing for each of these three cases is described below.

Snapshot datasets are initially blank and contain no data. Inodes are copied into the snapshot dataset after the original file that had been captured by the snapshot is modified subsequently to snapshot capture.

If the original data file has not been modified since the snapshot was captured, the processing determines, at step 906, that the snapshot dataset does not contain valid inode data. After this determination, the processing then retrieves, at step 912, the inode of the requested file from the active file system because the file had not been modified after the snapshot was captured and the state of that file on the active file system is the same as it was when the snapshot was captured. The data file is accessed, at step 914, by using the data block address stored within the inode of the active file system.

If the processing determines, at step 908, that the shadow inode within the snapshot dataset contains valid inode data except that the disk address portion contains "ditto" address indicators, the user data within the file has not been modified since the snapshot was copied. File metadata, if required, are retrieved from the shadow inode, and the data block addresses for the inode are retrieved, at step 912, from the inode for the original file within the active file system. Once the data block addresses are retrieved, the processing retrieves the requested data, at step 914, from the original file.

If the shadow inode is determined to contain, at step 910, valid inode data and valid data block addresses, the processing retrieves the requested data, at step 914, from the data blocks referenced by the data block addresses specified by the shadow inode contained within the snapshot dataset.

Lookups of data in a snapshot directory are handled by similar processing. Looking up data is performed in the exemplary embodiments that do not support snapshot chains as are described below by checking the snapshot directory for the data first and then reading the data from the original directory whenever a "ditto" address is encountered or when the directory inode falls within a sparse region of the shadow inode file.

Supporting Multiple Snapshots

Figure 6B:
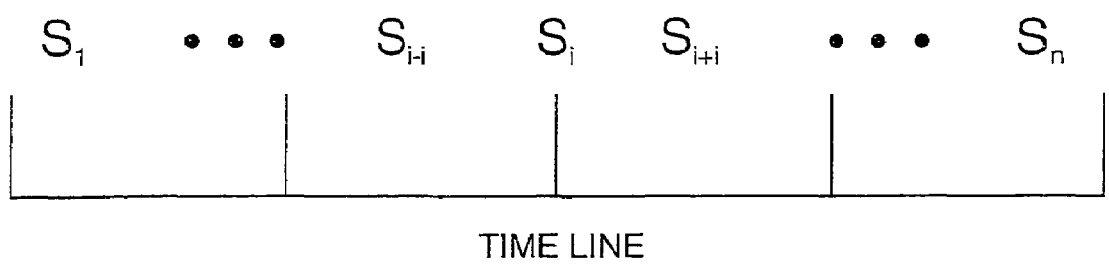
FIG. 6B is a timeline chronologically depicting the generation time of multiple snapshots, in an embodiment of the present invention.

Exemplary embodiments of the present invention also support any number of multiple snapshots. Multiple snapshots are used to capture the state of the active file system at different times. An exemplary snapshot timeline 620 is illustrated in FIG. 6B. The exemplary snapshot timeline 620 illustrates n each snapshots that have been captured over time. The first snapshot, S1, was the initial snapshot in this example. Subsequent snapshots were captured in chronological order with the most recent snapshot indicated as snapshot Sn. Intermediate snapshot Si was captured before snapshot Sn and after snapshot S1. Snapshot Si−1 was the snapshot captured just prior to snapshot Si and is the next oldest file system snapshot from snapshot Si. Snapshot Si+1 is the snapshot captured just after snapshot Si and is the next most recent snapshot file captured after snapshot Si. In order to create a new snapshot, a new, sparse shadow inode file is created and recorded in the superblock of the file system. The exemplary embodiments process updates to the original file system when multiple snapshots are present by copying inodes, indirect blocks and data blocks into the most recent snapshot according to the processing described above. The most recent snapshot, and the relative capture time among different snapshots, is determined in the exemplary embodiments by the order in which the snapshots are written into the superblock, and/or by the creation times of the snapshot dataset.

Figure 10:
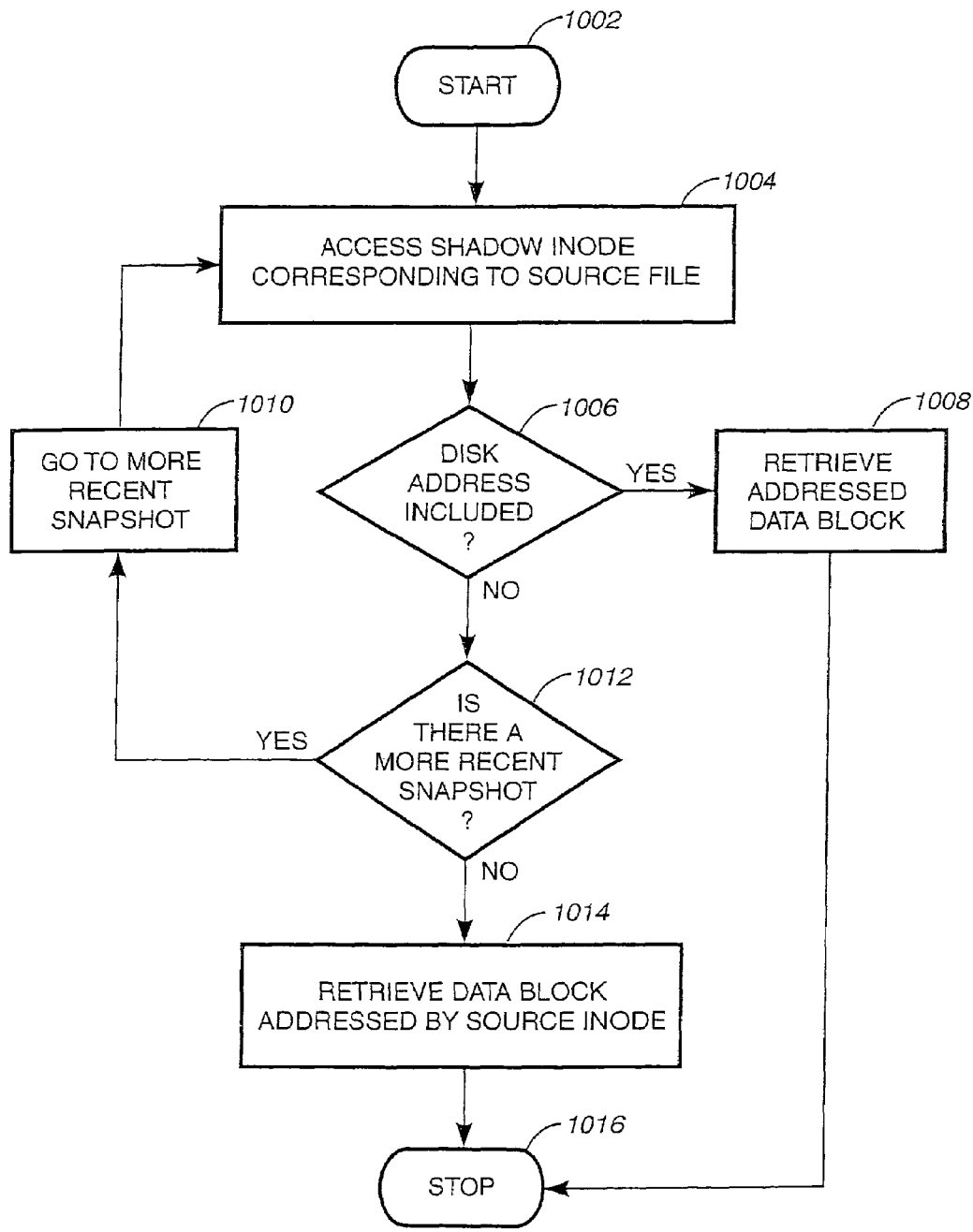
FIG. 10 is a flowchart depicting the operation and control flow of the snapshot retrieval process when multiple snapshots are available, in one embodiment of the present invention.
Figure 11:
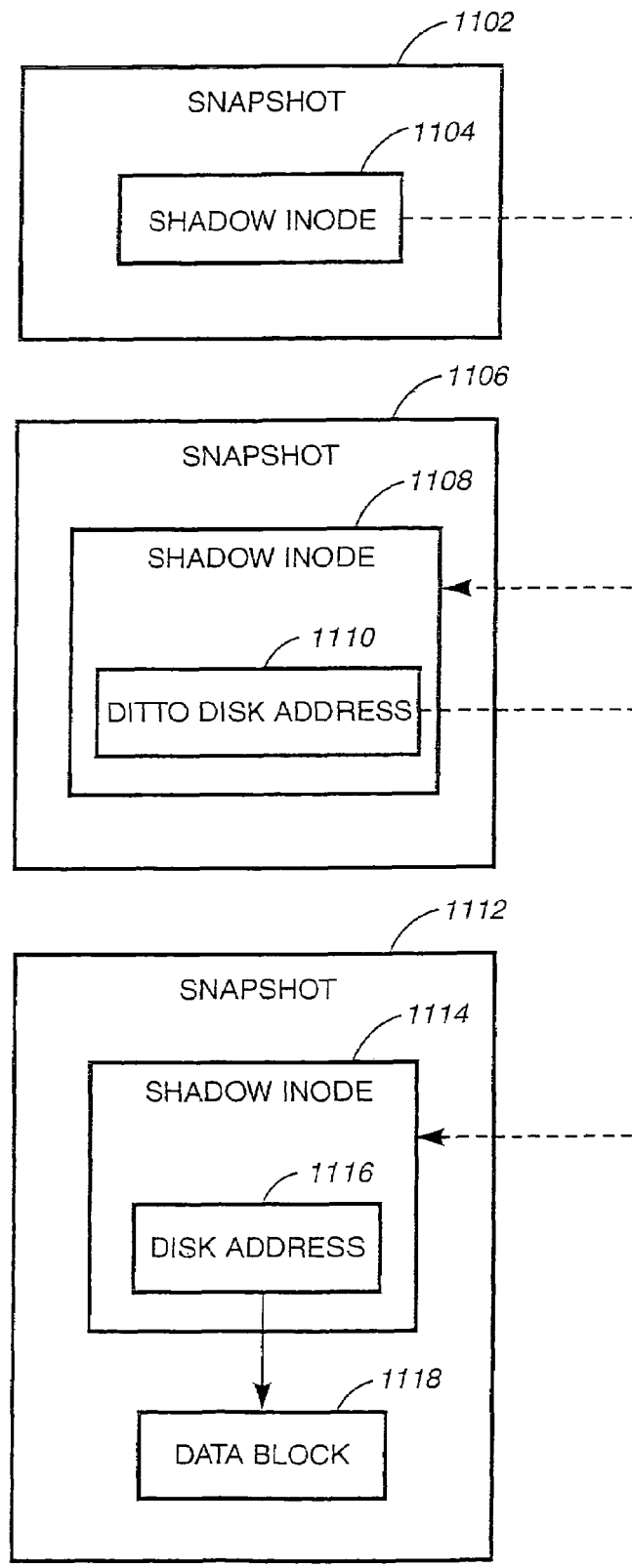
FIG. 11 is a block diagram depicting the retrieval of a snapshot when multiple snapshots are available, in an embodiment of the present invention.

When multiple snapshots are present, snapshots that captured the state of the file system at previous times are read by users or other applications. An exemplary snapshot series 1100 showing data contained within successive snapshots for a particular data block is illustrated in FIG. 11. The exemplary snapshot series 1100 illustrates the inferred references that are to be made in exemplary embodiments of the present invention in order to read a data block that is part of the dataset for snapshot Si−1 1102. The exemplary snapshot series illustrates snapshot Si−1 1102, Si 1106 and Si+1 1112 as illustrated in the exemplary snapshot timeline 620. The operation and control flow 1000 of the snapshot retrieval process when multiple snapshots are present is illustrated in FIG. 10. Control flow 1000 begins with step 1002 and flows directly to step 1004.

The snapshot retrieval process 1000 begins by accessing, at step 1004, the shadow inode associated with the desired data file that is contained within snapshot Si−1 1102. In this example, the processing encounters a first shadow inode 1104 with no valid inode data therein. This indicates that at the time the snapshot Si1106 had been captured, no updates had been made to the data file. The lack of valid inode data within the first shadow inode 1104 infers to the processing that the next more recent snapshot is to be examined for inode data. The lack of valid inode data within the first shadow inode 1104 also results in no disk address being included within that inode. The processing continues and determines, at step 1006, if there is a disk address in the shadow inode. In this example, the first shadow inode 1104 does not include a valid disk address, or any other data, so the processing continues by determining, at step 1012, if there is a more recent snapshot. The exemplary embodiments determine the existence of a more recent snapshot by examination of the superblock for the file system. In this example, there is a more recent snapshot, and the processing updates, at step 1010, the snapshot to examine. In this example, the snapshot to examine is updated to be snapshot Si 1106.

The processing continues, at step 1004, by examining a second shadow inode 1108, which is the shadow inode within snapshot Si 1106 that corresponds to the same file as the first shadow inode 1104 within snapshot Si−1 in the exemplary embodiments of the present invention. In this example, the snapshot Si 1106 contains a second shadow inode 1108 that contains valid inode data, but a "ditto" address is stored within the disk address data 1110 of the second shadow inode 1108. The valid inode data of the second shadow inode 1108 indicates that the metadata of the file were modified prior to capture of the snapshot Si+1 1112 and the second shadow inode 1108 contains the metadata that existed at the time of the capture of snapshot Si 1106 (which includes the state that existed at the time of snapshot Si−1 1102, the snapshot of interest).

File metadata for the snapshot Si, and therefore preceding snapshots captured subsequent to a prior modification of the data file and including snapshot Si−1 1102 in this example, are read from the second shadow inode 1108. The disk address data field 1110 of the second shadow inode 1108 contains a ditto value in this example, thereby indicating that subsequent snapshots are to be examined for the data block address of the snapshot data. The processing continues by determining, at step 1006, that no (valid) disk address is included, and processing continues by determining, at step 1012, if there are more recent snapshots. In this example there is a more recent snapshot, snapshot Si+1 1112, and that is set, at step 1010, to be the next snapshot to be examined.

The next more recent snapshot, snapshot Si+1 1112, contains a third shadow inode 1114, the inode within that snapshot dataset that corresponds to the requested file, for the data file being referenced. The third shadow inode 1114 in this example contains a valid disk address within its disk address data 1116. The valid disk address stored in the disk address data 1116 of the third shadow inode 1114 indicates that the data block had been updated after capture of snapshot Si+1 1112 and the prior state of that data block is stored within the snapshot dataset 1112 in data block 1118. This valid disk address is determined to exist, at step 1006, and the data block 1118 is retrieved, at step 1008, to support retrieval of the data of the snapshot that corresponds to the state of the file during snapshot Si−1 in this example.

In this example, the data within the requested data file that existed during the capture of snapshot Si−1 1102 was retrieved by following the shadow inode chain through repetitively examining, by accessing and determining, subsequent snapshots until the captured data was encountered in a snapshot dataset. This example had additional data stored within successive snapshots in order to simplify illustration. The exemplary embodiments of the present invention operate with intervening snapshots that do not contain data, but rather ditto addresses that indicate that the actual data is to be found in successive snapshots. Stated differently, in the event that the next more recent snapshot data also contains a "ditto" address, the process is repeated and the "ditto chain" is followed until a non-ditto disk address is found.

The snapshot retrieval process 1000 continues until it is determined, at step 1012, that there is not a more recent snapshot than the snapshot just examined. If all more recent snapshots contain a "ditto" address, the lack of a more recent snapshot is determined, at step 1012, and the data or directory block is retrieved, at step 1014, from the original file on the active file system. Similarly, operations that encounter a sparse region in a shadow inode file, which is determined in the exemplary embodiments by the presence of all null data bytes in the inode record, while accessing a file in an older snapshot retrieve the corresponding inode from the oldest, but more recent, snapshot that contains a valid inode copy, or from the original file if no snapshot contains an inode copy.

A snapshot within a series of multiple snapshots are able to be deleted or used to restore the data to a file system. Restoration of data to a file system in the exemplary embodiments from a snapshot data set that is not the most recently captured snapshot resolves the implied references in that snapshot through the use of processing described elsewhere in this specification. The processing of the exemplary embodiments of the present invention that deletes a snapshot dataset that is within a series of snapshots first determines if there is a snapshot in the snapshot sequence that was captured prior to the snapshot to be deleted. If there are previous or parent snapshots, the processing then determines if the next oldest snapshot, or any parent snapshots, contain implied references to data stored within the snapshot to be deleted. If data is stored in the snapshot to be deleted (i.e., not referenced through ditto addresses in the snapshot to be deleted), the processing to delete that snapshot will copy the data stored in that snapshot to the next oldest snapshot if the next oldest snapshot contains an implied reference to that snapshot. Once this data has been copied or moved into the next oldest snapshot, the snapshot is then able to be deleted.

Supporting Multiple Writable Snapshots

The snapshot processing described above creates "read only" snapshots. Read only snapshots are snapshot data sets that capture the state of a file system at the time the snapshot is created, but do not support a user or application directly writing to or otherwise updating the data that is stored within the snapshot. Some embodiments of the present invention support writing to and updating data that was captured in previously established snapshots. Writing data to a previously established snapshot has the effect of using the file system that existed at the time when the snapshot was established.

Figure 7B:
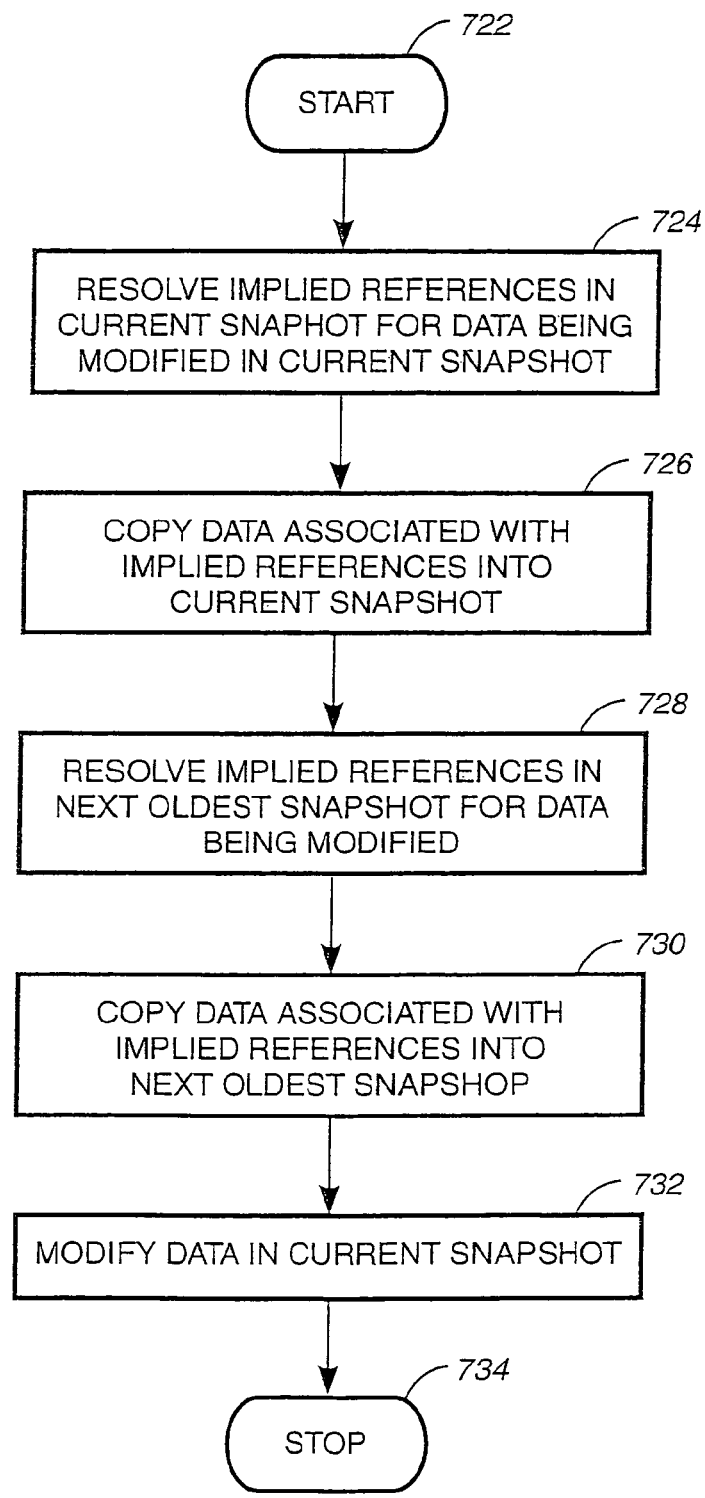
FIG. 7B is a flowchart depicting the operation and control flow of the snapshot update process when multiple snapshots are available, in one embodiment of the present invention.

Specialized processing is performed by the exemplary embodiments of the present invention to modify, or update, a snapshot when there are more than one snapshot present. In an example of a file system that has a series of snapshots 600 identified as S1, . . . , Si−1, Si, Si+1, . . . , Sn, wherein the snapshots are ordered by decreasing age, e.g., S1 is the oldest snapshot, and Sn is the most recent snapshot. The snapshot update processing as performed by an exemplary embodiment of the present invention is illustrated in control flow 720 of FIG. 7B.

Control flow 720 begins with step 722 and flows directly to step 724. The processing of this exemplary embodiment that updates, or modifies, a file within an existing snapshot, a snapshot that is referred to herein as snapshot Si, begins by resolving, at step 724, the data and/or metadata that is to be modified and that is referenced by implied references within snapshot Si, i.e., the snapshot to be updated. Resolution of data block addresses is performed in the exemplary embodiments, according to the snapshot retrieval process 1000. The resolution of data block addresses with implied references indicated by ditto values includes resolution of ditto values within the snapshot Si and any subsequent snapshots, as is described above. Ditto values encountered in snapshot Si and any subsequent snapshots are resolved by reference to the implied data in subsequent snapshots until the actual data value is obtained from either subsequent snapshots or from the original file system itself. After the implied references within Si are resolved, the data blocks that contain the data to be modified are copied, at step 726, into the current snapshot Si.

Once the data has been retrieved for snapshot Si, the next oldest snapshot, snapshot Si−1 in this example, is examined, at step 726, to determine if the next older snapshot Si−1 includes an implied reference to the data within snapshot Si that correspond to the data that is to be updated by the current operation. If snapshot Si−1 includes an implied reference to data contained within snapshot Si, i.e., if snapshot Si−1 contains a ditto value corresponding to or addressing data that is to be modified by the current operation, the implied reference is resolved, at step 728, by determining that the data is present in snapshot Si, due to the processing performed above. Once the implied references or ditto addresses are resolved, the processing copies, at step 730, the data to be modified by the current operation into the next oldest snapshot, snapshot Si−1.

For the purposes of processing an update of data contained within snapshot Si, the next oldest snapshot, snapshot Si−1, is equivalent to a read-only snapshot of the file system represented by snapshot Si, as is described above. In the case of updating a snapshot Si, the snapshot Si−1 is used to "capture" data from the snapshot Si as the data in snapshot Si is updated or changed, as opposed to capturing data from the original file system as is described above. The snapshot Si is, however, able to contain "ditto" values unlike the original file system. The "ditto" values encountered while reading data within snapshot Si are resolved by following the ditto chain contained in subsequently captured snapshots so as to retrieve the data/metadata that is to be copied from the more recent snapshot or from the original file system into snapshot Si−1.

Once the data to be modified is copied into the snapshot dataset associated with snapshot Si and an appropriate capture of the data is included in snapshot Si−1, the data within snapshot Si is modified, at step 732, as determined by the user or other processing within the exemplary embodiment.

Taking Snapshots of a Snapshots

Some embodiments of the present invention perform processing that captures snapshots of existing snapshots. This is especially desirable if prior snapshots are writable and are able to be modified after being captured. An exemplary use for writable snapshots is the testing of new software. Testing of new software is often aided by executing the software multiple times while using the same data. Performing multiple executions of software by using the same input data is performed by taking a new snapshot of the original snapshot data before starting the multiple executions by writing to the original snapshot data.

The processing to create a snapshot of a snapshot consists of steps that are similar to the creation of a snapshot of an original file system. These steps are: 1) bring all data update activity to a quiescent state, 2) create a new shadow inode file, and 3) record the existence of the new snapshot (including the location of the new shadow inode file) in the superblock. In the creation of a snapshot of a snapshot, however, the information stored in the superblock also contains an "ancestor" field that indicates whether the snapshot is a snapshot of the original file system or is a snapshot of a snapshot. In the case of a snapshot of a snapshot, the ancestor field indicates the earlier snapshot upon which that snapshot is based. In the case of a snapshot of a file system, the ancestor field indicates the file system of which the snapshot was taken.

Embodiments that support snapshots of snapshots define the "previous" snapshot, indicated by the notation parent(S), to be the oldest snapshot that is more recent than the snapshot S and that has the same ancestor as S. In the case that there is no more recent snapshot with the same ancestor, then parent (S) is the ancestor of S. This relationship organizes all snapshots into a tree with the original file system at the root of the tree. For example, consider taking a first snapshot, referred to as snapshot S1, of the active file system. Sometime after this first snapshot, a subsequent snapshot, snapshot S2, is then taken of the active file system. This gives us a snapshot series of S1 and S2. A third snapshot, snapshot S3, is then taken of snapshot S2 The snapshot tree in this example has two branches that split from the snapshot dataset captured by snapshot S2. with snapshot S1 forming one branch and snapshot S3 forming the other branch. Once these two branches are formed, changes made to the datasets in either branch (if they are writable) do not affect the data in other snapshot branches. Using the parent function, parent(S1)=S2, parent (S2)=the active file system and parent(S3)=S2. As a consequence of the two branches in this example, an update to snapshot S2 requires that the data being modified in snapshot S2 be copied into both snapshot to which it is a parent, namely snapshots S1 and S3.

A generalized processing algorithm is used in the exemplary embodiments of the present invention for reading and updating snapshot datasets. One element of the generalized processing is that "ditto" values that are encountered while reading a snapshot S are resolved by reading the corresponding inode or data block from snapshot identified by parent(S). If the snapshot identified by parent(S) also contains a "ditto" value, the data is resolved by reading from the snapshot identified by parent(parent(S)). This processing is repeated until the ditto value is resolved by a encountering the actual data or inode value.

Exemplary embodiments of the present invention that support capturing snapshots of snapshots and writing to snapshots also copy the current data and metadata content from snapshot S to all children snapshots of S, i.e., to all snapshots S' where parent(S')=S, prior to updating a file in snapshot S. A "child" of a snapshot S is a snapshot whose ancestor is S and wherein there are no more recent snapshots of S. In order to prepare the data in snapshot Si for updating, the data/metadata to be modified in the update in snapshot Si is copied from parent(Si) to Si.

Hot Standby File Systems

Exemplary embodiments of the present invention utilize snapshots to maintain a hot standby file system. A hot standby file system is a separate file system, which is usually maintained on a different data storage device, that maintains a copy of data that is stored on a primary file system and is used in conjunction with the primary file system in order to insure high availability of the entire system. When a primary file system becomes unavailable, due to a hardware, communications or other problem, the hot standby file system is able to assume the functions of the primary file system and allow the system to continue operation. Hot standby file systems are particularly useful in systems that rely upon a continually available file system. Conventional systems utilize disk mirroring to implement hot standby file systems. In traditional implementations of disk mirroring, the mirror is a second disk that is continuously updated with data that is written to the primary disk. Conventional approaches require a continuous, high-speed connection between the primary, or source, file system and the standby, or target, file system.

In the exemplary embodiments, on the other hand, a file system snapshot is a logical copy of the file system content as of a single point in time. As a record of a previous state of the file system, a snapshot is useful, for example, to allow a user to retrieve an old copy of an accidentally deleted file (undelete). Another common use of snapshots is to back up a file system to tape while allowing continued read/write access to the file system during the backup process. Creating a snapshot in some of the exemplary embodiments does not require making a physical copy of all file system data at the time of snapshot creation. Instead, copying of file data is deferred until the next time the data is modified (a process referred to as "copy-on-write"). This makes snapshots more efficient, because it reduces the time it takes to create a snapshot as well as the disk space required to keep a snapshot.

Exemplary embodiments of the present invention use snapshots to create and maintain a hot standby file system that obviates the requirement for a high speed continuous connection between the original and the mirror file system. The mirror file system of these embodiments is also able to act as a mirror for multiple primary file systems as well as a primary file system for other data users.

Figure 15A:
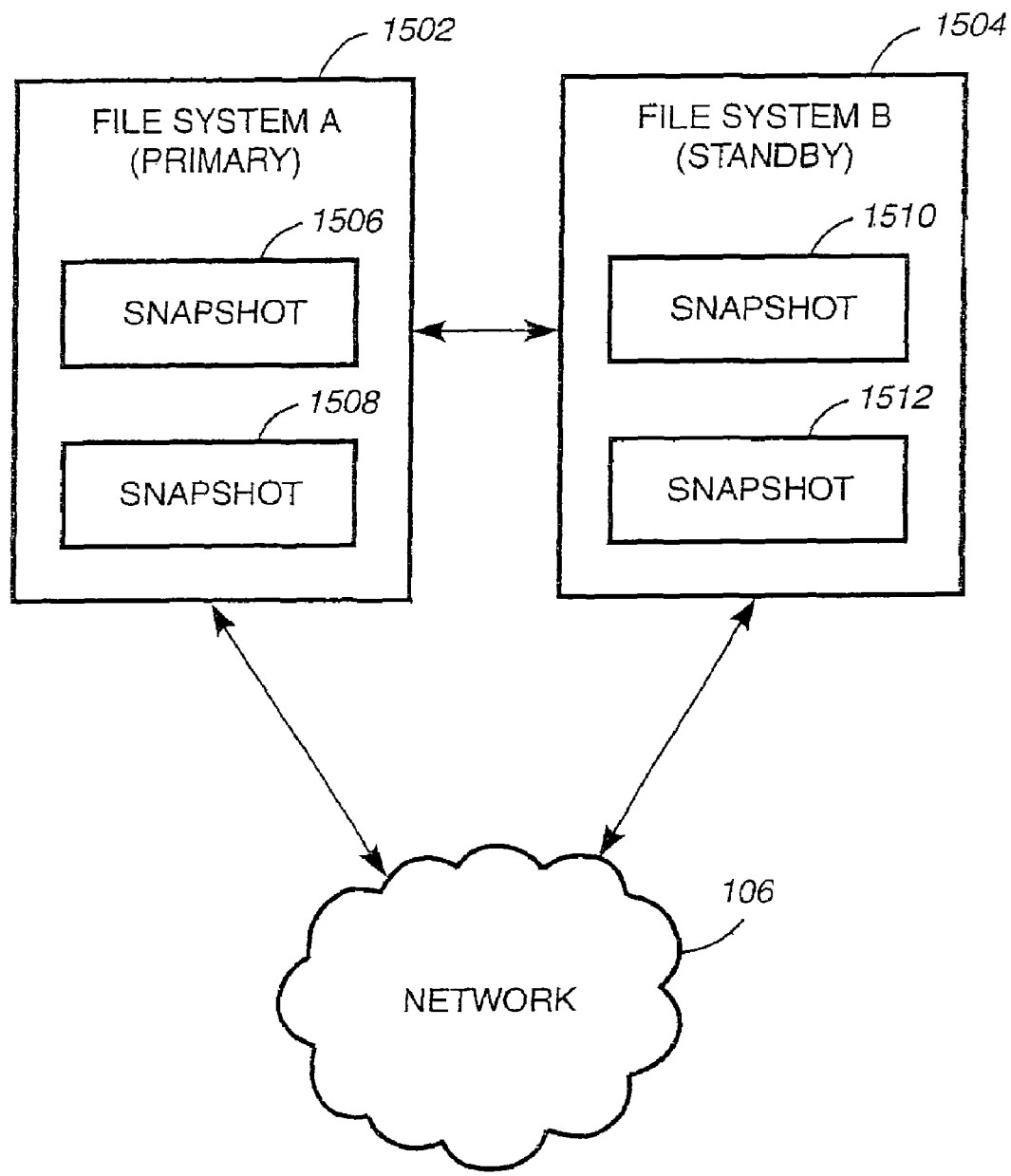
FIG. 15A is a block diagram illustrating the overall system architecture of a primary file system with a standby file system, in one embodiment of the present invention.

A block diagram of an overall system architecture for a primary and standby file system 1500 according to an exemplary embodiment of the present invention is illustrated in FIG. 15A. This exemplary system architecture has a primary file system, denoted as file system A 1502, a standby file system, denoted as file system B 1504 and a network 106 to provide communications between these file systems. Alternative embodiments maintain the primary and backup file systems within a single processor, thereby obviating the requirement for a network 106. File system A 1502 in this example has two snapshot datasets, a first snapshot dataset 1506 and a second snapshot dataset 1508. These two snapshot datasets captured the state of the file system A 1502 at different times. File system A 1502 operates by communicating snapshot datasets, such as first snapshot dataset 1506 and second snapshot 1508, to file system B 1504. File system B 1504, in turn, stores copies of the snapshot datasets that are received from file system A 1502. File system B 1504 stores a first snapshot dataset copy 1510 and a second snapshot dataset copy 1512 to support standby data storage operations.

These embodiments of the present invention create a hot standby file system by first generating a snapshot of the original (source) file system and transferring the entire data set for that snapshot to a second file system in order to create an identical copy of the original file system (i.e., a mirror file system). These embodiments then periodically bring the standby or mirror file system up-to-date by generating new snapshots of the original file system and determining the changes between these new, more recently captured or generated snapshots and the state that was captured by a previous snapshot of the original file system that had been transferred to the mirror file system. The original file system generates a set of changes that are then communicated and applied to the standby file system in order to bring the standby file system up to the state of the new snapshots captured on the original file system. The original file system snapshot and the set of changes that are generated by these file systems contain tags to ensure completeness in the mirror file system by identifying the order of creation or the order in which these set of changes where applied. In this description, the term "restore" indicates a file system has been brought to the state of another file system by processing a dataset that represents an entire snapshot from that other file system. The term "apply" indicates that a file system has been updated to a more recent state of another file system by processing a set of changes that was generated between two snapshots on the other file system.

Maintenance of the standby file system is facilitated in the exemplary embodiments by maintaining snapshot tags that uniquely identify both the different snapshots that recorded the state of each of the file systems at different times and that identify the set of changes that are generated between two snapshots. The snapshot tags are used to coordinate proper data synchronization between the mirror file system and the active file system when switching the mirror file system from a read only file system to the active read/write file system by ensuring that the latest snapshot is applied after a failure disables the original file system. Once the initial mirror file system becomes the active file system that is used by client processors (i.e., the "new original" file system), snapshots are captured of the new original file system and snapshot tags are used to restore the previous original file system, which is now the mirror, to maintain the original file system as the new standby, or mirror, file system.

The exemplary embodiments of the present invention use snapshot tags to identify each snapshot and the file system from which that snapshot was captured. The snapshot tag notation used herein consists of the format (A:S1) wherein the first element, "A" in this example, identifies the file system and the second element, "S1" in this example, is the snapshot identifier for that snapshot. This allows the different file systems in the hot standby system described herein to capture snapshots at different times and only use a subset of those snapshots to synchronize the data between those file systems. The file systems of the exemplary embodiments generate a set of changes between snapshots that are captured for that file system. These sets of changes include a pair of tags to identify the snapshots between which the changes were determined. As an example, a snapshot tag pair (A:S2, A:S3) is included within a set of changes that were generated as the changes that occurred between snapshot S2 and snapshot S3 that were captured on file system A. This set of changes is only able to be successfully applied to a file system that has been restored to the state of snapshot S2 from file system A. For example, if file system B receives this snapshot and snapshot S2 from file system A has not been restored to file system B or changes have not been applied to file system B that resulted in file system B having the state of snapshot (A:S2), application of the set of changes with the snapshot tag pair (A:S2,A:S3) is inappropriate. A file system discards a set of changes that is received and does not have a snapshot pair that starts with a snapshot tag that corresponds to the most recently restored or applied snapshot to that file system. Exemplary systems identify the last applied or restored snapshot and request from the other file system the set of changes that corresponds to the changes made since the last applied or restored snapshot.

The snapshot tags are stored in the snapshot and also in each of the file systems. The snapshot tags stored in the file systems are stored in the superblock for the file system and identify the latest snapshot that was restored in order to establish a base file system and the snapshot tag of the latest snapshot that has been applied to the base file system is also stored in the superblock of the file system. The snapshot tag in the file system is compared to the snapshot tag of a newly received snapshot or set of changes before that new snapshot or set of changes is applied to the file system. Only a snapshot or a set of changes with a base snapshot tag that corresponds to the base snapshot that has most recently been used on the file system is applied to the file system. Once a snapshot from a source file system is applied to a mirror file system, another snapshot is captured of the mirror file system that puts it in sync with the original file system. The file systems of the exemplary embodiments store the snapshot tags for the last restored or applied data in the superblock of the file system. The snapshot tags identify the source file system and the snapshot identifier of the last snapshot on the remote system that was copied to this file system. An example use of this data is in the event that a series of snapshot updates are lost or corrupted when received by a file system. In the event that a file system does not properly receive one or more sets of changes, the last properly applied set of changes is determined and the remote file system is queried for the set of changes that were made to that file system since the snapshot that corresponds to the last set of data that was properly restored or applied.

After the previous mirror file system is updated with all of the snapshots of the original file system and is converted into the active file system, new snapshots are captured of the currently active file system (which was the mirror file system). Also at this point, the active and mirror roles are reversed, and snapshots of the currently active file system are applied to the original file system, which has become the new mirror file system.

Cutting Over to the Hot Standby File System

In the event that a client (e.g., an application server) cannot access to the original (source) file system because of network problem or other failure within the source system itself, exemplary embodiments of the present invention switch access to the mirror, or hot standby, file system to allow clients to restart their jobs quickly and without waiting for recovery of the network or the source file system. Such a switch is performed in these embodiments through the following steps that are typically performed by a system administrator:

The system administrator executes the FileImageRestore command using the latest snapshot (i.e., the snapshot created just after the previous incremental or baseline execution of the FileImageMirror command) on the target file system. The FileImageRestore command applies the snapshot to the specified image, the mirror file system image in this case. The FileImageMirror command created a copy of the original file system and the associated snapshot data to capture the state of the original file system at the time of the command execution. This process ensures that the active file system is "clean." The system administrator then exports the active target file system to the clients. The system administrator then switches the client's server configuration from the original file system to the standby file system.

Figure 15B:
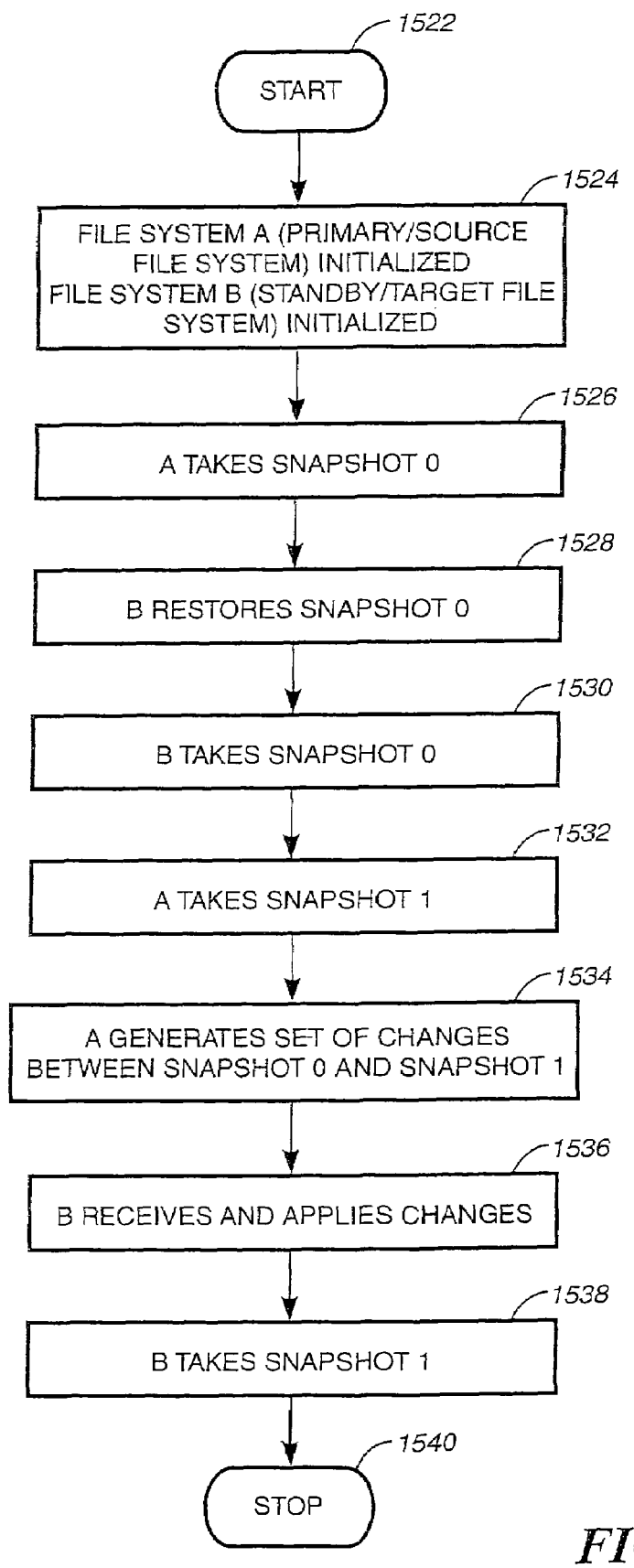
FIG. 15B is, a flowchart depicting the operation and control flow of the standby file system update process, in one embodiment of the present invention.
Figure 15C:
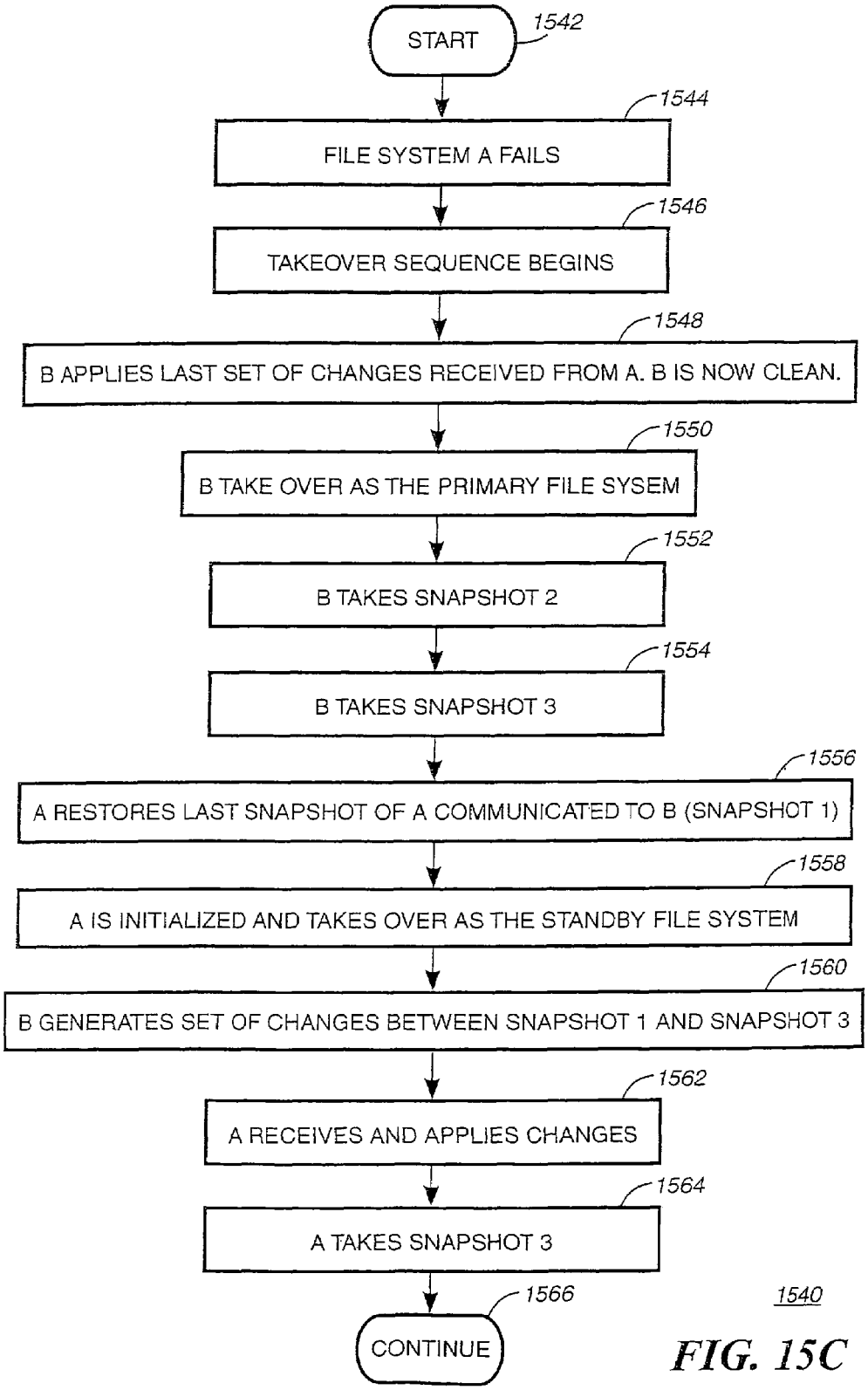
FIG. 15C is a flowchart depicting a first segment of the operation and control flow of the standby file system activation process, in one embodiment of the present invention.
Figure 15D:
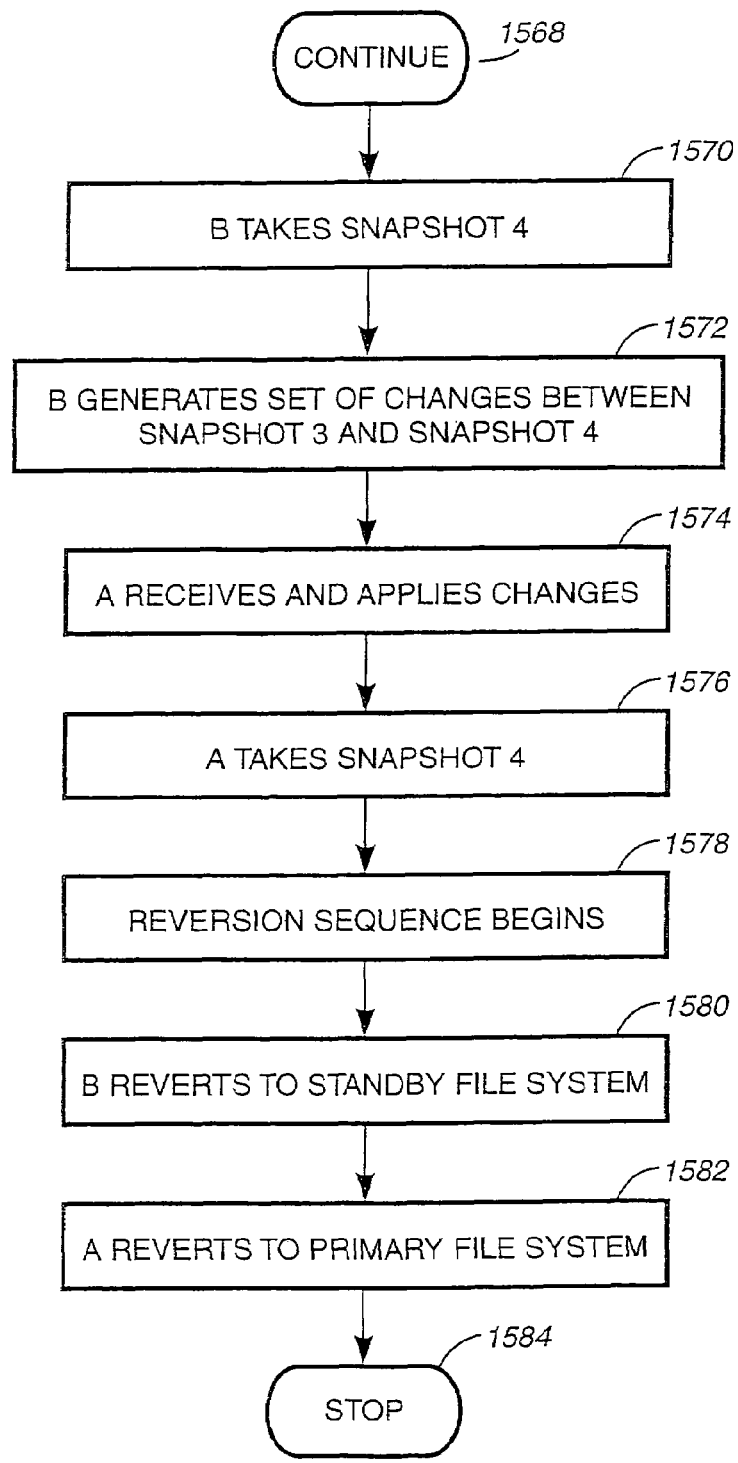
FIG. 15D is a flowchart depicting a second segment of the operation and control flow of the standby file system activation process, in one embodiment of the present invention.

Three segments of a processing flow for the standby file system update processing of an exemplary embodiment of the present invention is illustrated in FIGS. 15B, 15C and 15D. The first segment of the exemplary standby file system update processing is illustrated in control flow 1520 of FIG. 15B. Control flow 1520 begins with step 1522 and flows directly to step 1524. The process begins by initializing, at step 1524, file system A and file system B in preparation for operation. The processing used to initialize a file system is dependent upon the computer operating system and other factors affecting the operation of the file system of the particular embodiment. File systems are initialized under the Unix operating system, for example, by using the "mount" command and other commands according to the configuration of the file system. File system initialization of some embodiments also requires preparation of the data storage hardware. After the file systems begin operation, file system A captures, at step 1526, snapshot 0 and communicates this snapshot dataset to file system B. Upon receipt of the snapshot 0 dataset, file system B restores, at step 1528, the snapshot dataset so as to act as a standby file system. File system B then stores the snapshot tag (A:S0) into its superblock to identify the snapshot corresponding to the snapshot identifier for snapshot 0 from file system A is the last data set restored or applied to file system B.

After this restoration, file system B contains a copy of the data that was present on file system A when snapshot 0 was captured. After this restoration, file system B captures, at step 1530, snapshot 0. Recapturing snapshot 0 on file system B has the effect of establishing a clean snapshot dataset on file system B and thereby allowing a more efficient access to that snapshot on file system B. It is to be noted that this description uses the same snapshot identifiers (e.g., snapshot 1) for the same data on both file systems. This if for clarity of explanation and it is to be noted that the snapshot identifiers used on the two file systems do not have to have the same value for the same data. The snapshot tag, which identifies the file system and the snapshot identifier, is stored on the file system, as described herein, and is used to synchronize the data of the two file systems in these exemplary embodiments.

As these file systems continue to operate, file system A captures, at step 1532, snapshot 1. After capturing snapshot 1, the processing of the exemplary embodiments then determine, at step 1534, the changes that were made to the data in the file system between snapshot 0 and snapshot 1. The processing of file system A then generates a data set that contains these changes and communicates that dataset to file system B. This set of changes contains the snapshot tag pair (A:S0, A:S1) to identify that it contains the changes on file system A that were made between the capture of snapshot 0 and snapshot 1. Upon receipt of the set of changes between snapshot 0 and snapshot 1, file system B verifies that the snapshot tags contained in the set of changes properly correspond to the data that has been restored or applied to file system B. The superblock for file system B identifies that the state of file system B was last restored or applied to the snapshot tag (A:S0). After file system B verifies that the last restored or applied data matches the data preceding the received set of changes, file system B applies those changes, at step 1536, to the data on file system B thereby updating the data contained in file system B so as to be identical to the data resident on file system A at the time snapshot 1 was captured. File system B then stores the snapshot tag (A:S1) into its superblock to identify the snapshot corresponding to the snapshot identifier for snapshot 1 from file system A is the last data set restored or applied to file system B. File system B then captures, at step 1536, a copy of snapshot 1. These steps repeat during the normal operation of the file systems.

The second segment of the exemplary standby file system update processing is illustrated in control flow 1540 of FIG. 15C. Control flow 1540 begins with step 1542 and flows directly to step 1544. In this segment of operation, file system A fails, at step 1544, due to mechanical or other difficulties with the file system. The takeover sequence begins, at step 1546, upon a determination that file system A has failed. File system B then restores, at step 1548, the last snapshot that was received. As a result of this restoration, file system B is now clean, which means that file system B is in a consistent state. This allows for a condition where file system A failed while a set of changes was being transferred and applied to file system B by restoring file system B to its last known consistent state.

After file system B has been restored the most recent snapshot that was received from file system A, file system B takes over, at step 1550, as the primary file system. This results in file system B acting as the primary storage device that is used by clients. As file system B operates as the primary file system, file system B captures, at step 1552, snapshot 2 in order to capture the state of file system B. In this example, file system B then continues to operate and captures, at step 1554, snapshot 3. File system A in this example then becomes available again, and file system A restores, at step 1556, the last snapshot of file system A, snapshot 1 in this example, that was communicated to file system B. After restoration of the file system on file system A, file system A is in a known state and then is initialized, at step 1558, and acts as the standby file system.

After file system A is initialized and becomes the standby file system, file system B then generates, at step 1560, a set of changes between the last snapshot that was received from file system A, snapshot 1 in this example, and communicates that set of changes to file system A. This set of changes contains the snapshot tag pair (A:S1, B:S3). File system A receives, at step 1562, this generated set of changes from file system B and applies those changes to the data stored on file system A in order to establish a copy of the data of file system B. After applying these changes, file system A then captures a snapshot, snapshot 3 in this example, of the data on that file system. If a previous snapshot of file system A in this example does not exist on file system a, then an entire backup dataset of file system B is generated at file system B, communicated to file system A and restored on file system A.

A system administrator is now able to reestablish file system A as the primary file system and file system B as the standby. An example reversion processing flow diagram 1590 that performs this reversion in an exemplary embodiment of the present invention is illustrated in FIG. 15D. This processing is continued, at step 1568, from the standby file system update processing 1540 and proceeds to step 1570. File system B captures, at step 1570, snapshot 4 to capture the state of the current primary file system, file system B. File system B then generates a set of differences this snapshot, snapshot 4, and the last snapshot that was communicated to file system A. This generated set of changes is received, at step 1574, by file system A and applied to the data stored in file system A. After this set of changes is applied, file system A captures snapshot 4 in order to preserve a clean snapshot within file system A. The reversion process then begins, at step 1578, to cause file system A to again become the primary file system. File system B reverts, at step 1580, to being the standby file system and file system A reverts, at step 1582, to being the primary file system. The processing then terminates, at step 1584.

It is obvious that the snapshot data sets captured to implement the hot standby file system described above are also able to be used for other purposes. In addition to the snapshots captured for the hot standby file system, the processing of the exemplary embodiment is also able to capture additional snapshots at various times and not use those snapshots in the maintenance of the hot standby file system. Other snapshots are able to be used, for example, to make tape backups of the file system.

Dynamic Snapshot Links

The operation of the exemplary embodiments creates a number of snapshots of the original file system that each reflects a state of the file system at the time that snapshot was captured. Different techniques are used by different embodiments of the present invention to organize and identify these multiple snapshots. Some embodiments identify the files within the snapshot dataset by using the same file names that are assigned to the files within the original file system but add some additional context to allow the file system to distinguish the original file from a version stored in a snapshots. The different embodiments present this additional context to the user in a number of ways, such as locating the snapshot within the original file system, but under a unique directory corresponding to the snapshot identifier.

Other embodiments present the context to the user by accessing the snapshot datasets via a different file system or via a different mount point of the same file system. Internally, the file system within these embodiments distinguishes the file in a snapshot dataset from the original file in the active file system by encoding additional context in some manner, such as in the high-order bits in the inode number or encoding the context in a unique file system number. This encoded information that is used to uniquely identify the snapshot is referred to herein as the snapshot identifier.

Exemplary embodiments of the present invention utilize dynamic snapshot links to provide access to the snapshots and to aid in identifying the desired snapshot dataset and associated snapshot identifier. These embodiments utilize one or both of two types of dynamic snapshot links, a "snapshot latest link," which is a single link to a previous snapshot version of a file, and a "snapshot link directory," which is a directory that contains link entries for the files within the one or more available snapshots. Some of these embodiments combine these two variants such that a snapshot link directory also contains a snapshot latest link to readily identify the most recent version of the target.

Alternative embodiments of the present invention utilize dynamic snapshot links to reference snapshots that are captured and maintained by various techniques, including snapshot structures that are different from those described elsewhere within this specification. For example, snapshots that utilize snapshot inode files that contain a complete set of inodes that each point to data blocks within the active file system or subsequent snapshots, including systems that utilize reference counters that maintain a count of the number of snapshot inodes that refer to a particular data block to ensure that no inodes refer to a data block prior to deletion of that data block, are able to use dynamic snapshot links to efficiently reference multiple snapshot data sets that use that architecture.

Snapshot Latest Link

The snapshot latest link utilized by exemplary embodiments of the present invention is, like a conventional file system link, an entry in a file system directory that maps the link name to a specific file (or directory) in the file system. In contrast to a conventional link, which statically maps the name to a specific file's inode number and therefore a specific snapshot identifier, a snapshot latest link maps the link's name to the inode number of a specific file but does not bind the snapshot identifier to the link until the system operates to access the file that is associated with that snapshot latest link. An operation that accesses the file that is the target of a snapshot latest link activates that link, thereby triggering resolution by the processing of the exemplary embodiments of the link to the target file, such as the inode file, within a particular snapshot dataset. This causes the snapshot latest link to dynamically point to the most recent snapshot version of the target file each time the directory is read.

A snapshot latest link in the example embodiments is created in a manner that is similar to creating a conventional directory link, i.e., by specifying both the target file (or directory) for the link and the name that is to be assigned to the link. Links in this context are created for files or directories that already exist. The file systems of these embodiments maintain a count of links that exist for each file and directory, and upon creation of a new link, the link count for the target file is incremented. Upon deletion of a link, the link count is decremented. The link count is used to ensure that a target file or directory is not deleted until all links to that file or directory have been deleted. Embodiments that maintain a snapshot latest link ensure that the file that is referenced by the snapshot latest link points to the most recent snapshot version of the original file system. If there are no snapshots available when the snapshot latest link is created, these embodiments defer creation of the link until the snapshot directory is read.

Figure 12A:
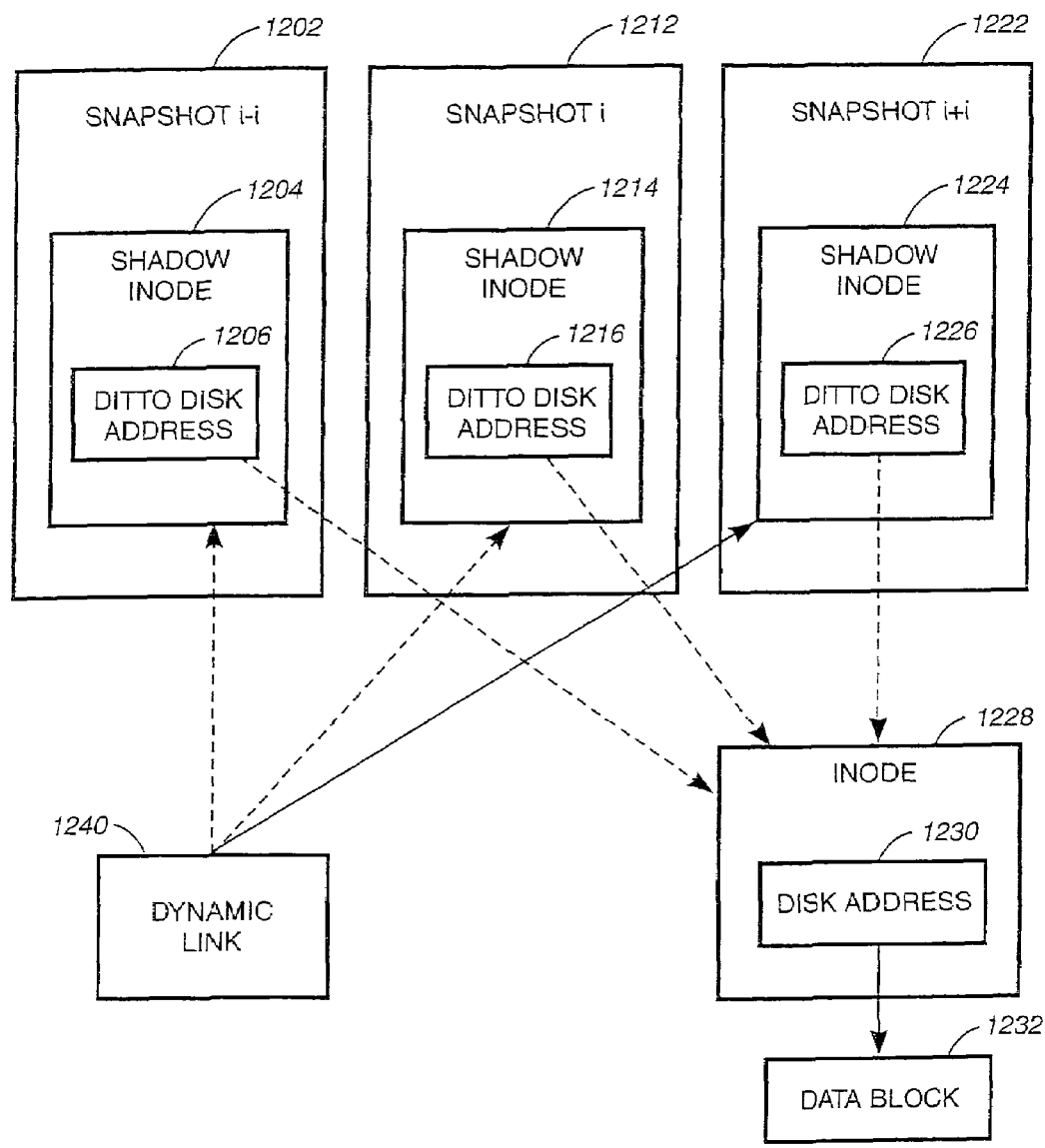
FIG. 12A is a block diagram depicting a dynamic link to the most recent shadow inode when multiple snapshots are available, in one embodiment of the present invention.

An exemplary snapshot latest link data structure diagram 1200 is illustrated in FIG. 12A. The exemplary snapshot latest link data structure 1200 shows three consecutive snapshots, snapshot i−1 1202, snapshot i 1212 and snapshot i+1 1222. These three snapshots were captured at different times and each of these three were the latest snapshot at some point in time, i.e., snapshot i−1 1202 was the most recent snapshot at time i−1, snapshot i 1212 was the most recent at time i, and snapshot i+1 1222 was the most recent at time i+1. An exemplary snapshot latest link for a specific file, dynamic link 1240, points to the most recent snapshot. The snapshot latest link shows that the snapshot latest link, dynamic link 1240, pointed to the snapshot i−1 1202 when that snapshot became the latest snapshot at time i−1. This example then has snapshot i 1212 becoming the latest snapshot at time i, and the snapshot latest link 1240 was then updated to point to snapshot i 1212. As snapshot i+1 1222 became the latest snapshot at time i+1, the snapshot latest link 1240 was assigned to snapshot i+1. In this example, all snapshots for the file associated with the snapshot latest link 1240 contained ditto disk addresses for the inode associated with that file, so all shadow inodes within these three snapshots inferred a reference to the inode of the current file system where the data for that file was and is stored.

Figure 12B:
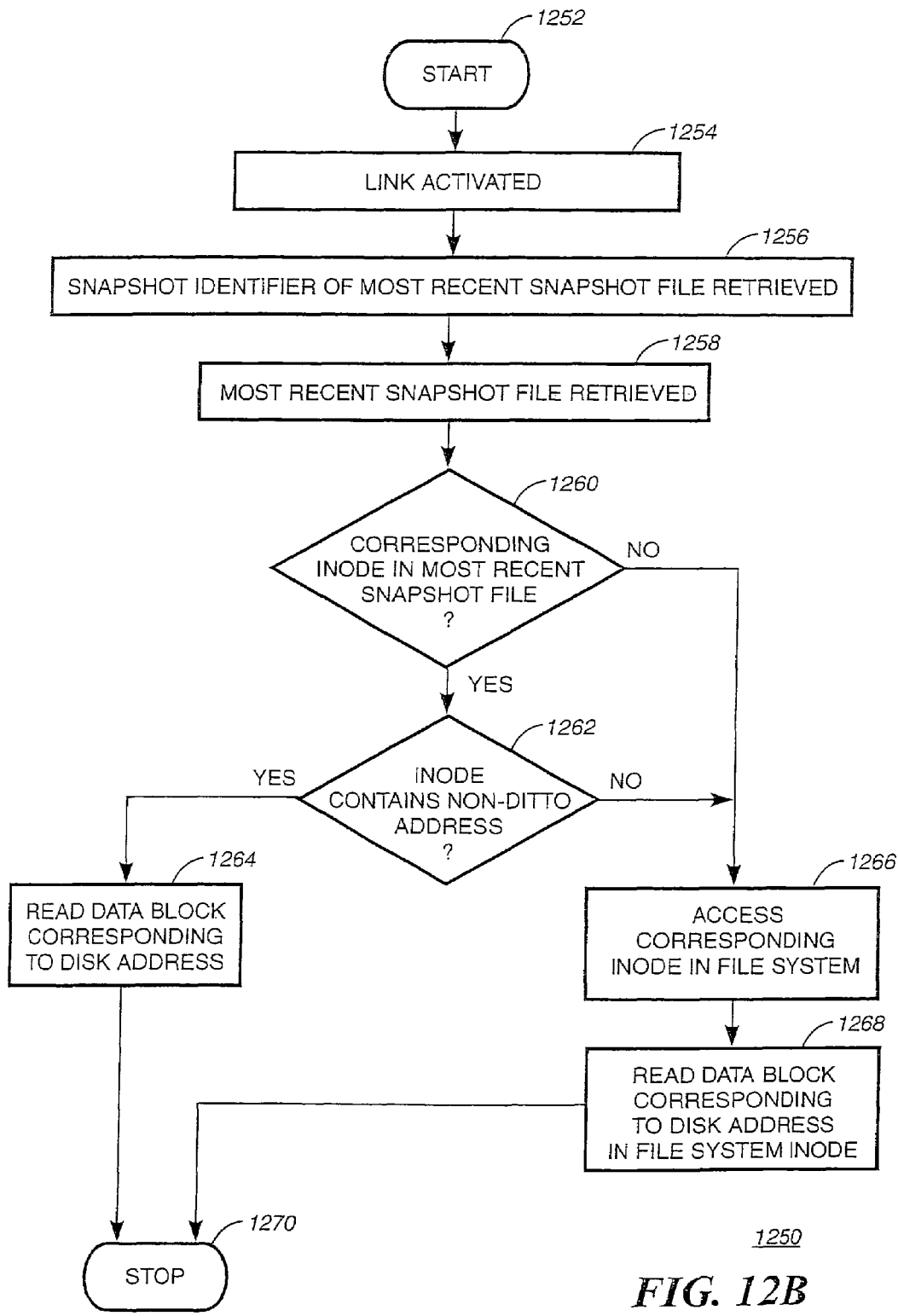
FIG. 12B is a flowchart depicting the operation and control flow of the snapshot retrieval process using a dynamic link, in one embodiment of the present invention.

The snapshot latest link data retrieval processing control flow 1250 for an exemplary embodiment of the present invention is illustrated in FIG. 12B. Control flow 1250 begins with step 1252 and flows directly to step 1254. The snapshot latest link data retrieval processing control flow 1250 illustrates the processing performed to retrieve data from the latest snapshot of a requested file. The processing starts by activating the snapshot latest link 1240, at step 1252, that points to the most recent available snapshot that contains the file associated with the snapshot latest link 1240. The file system next retrieves, at step 1256, the snapshot identifier for the most recent snapshot and then retrieves, at step 1258, the most recent snapshot dataset. The processing then advances to determine, at step 1260, whether the inode in the previously retrieved snapshot dataset contains valid inode data. If the retrieved shadow inode is determined to contain valid data, the processing continues to determine, at step 1262, if the disk address within the snapshot inode contains a non-ditto value, i.e., a valid value. If the inode is determined to contain a valid disk address, the processing continues to read the data block referenced by the disk address contained within the snapshot inode.

If the retrieved shadow inode is determined, at step 1260, to not contain valid inode data or it is determined, at step 1262, that the shadow inode does not contain a valid disk address, the inode of the current file system is accessed, at step 1266, to determine the disk address where the file is stored. The processing then reads, at step 1268, the data from the current file.

Snapshot Link Directory

A snapshot link directory is a subdirectory that contains links to file and/or directories stored within snapshot datasets. The snapshot link directory is able to exist either within the original file system or on a different file system. These embodiments store one entry in the snapshot link directory for each snapshot version of the original file (or directory). Each entry of the snapshot link directory maps the unique snapshot name to the version of the data file that is saved in that snapshot. As new snapshots are created or old snapshots are deleted, the entries in the snapshot link directory are changed so that the snapshot link directory maintains a complete list of available snapshot versions of the original files.

The snapshot link directory of these embodiments is created by specifying the target file (or directory) for the link and the name to be assigned to the snapshot link directory. The link count for the target file of the link, which is the file stored in or referenced by the snapshot dataset, is incremented to reflect the new link that addresses the file. Once the snapshot link directory is created, the parent directory maintains an entry for the subdirectory that is the new snapshot link directory. The entry within the parent directory to the snapshot link directory is static and these embodiments of the present invention store the link to the snapshot link directory as a regular directory entry. These embodiments do not, however, store static entries within the snapshot link directory itself, but rather the snapshot link directory entries are generated each time there is an access request into the directory, such as when the snapshot link directory is read. These embodiments generate one entry within the snapshot link directory for each available snapshot version of the original file. The entries within the snapshot link directory each map the snapshot name to the inode of the snapshot data file inode and the snapshot identifier. If there are no snapshots available, the snapshot link directory generates no entries for the snapshots. In the exemplary embodiments, reading a snapshot link directory that does not have snapshots present generates the standard directory entries for itself (".") and for its parent ("..").

An inode number in a conventional file system uniquely identifies a file at a given time. In the operation of the file system, however, it is common for files to be deleted and new files to be created. In the course of such operations, the inode for the deleted file is sometimes reallocated to a new file thereby reusing the inode number. To distinguish these two unrelated files, the file system typically maintains a "generation number" per inode that is incremented each time the inode is reused. Since the generation number remains constant over the life of the file, the file system of the exemplary embodiments use it to determine the list of available snapshots that store a version of the original file. The embodiments of the present invention that utilize snapshot link directories only generate entries in the snapshot link directory for files that have the same inode number and the same generation number. When the snapshot link directory is created, the oldest available snapshot that contains a version of a particular file is determined and the value corresponding to that file is stored within a cache for subsequent processing. This cached value allows the list of snapshots to be generated without a subsequent query to determine which snapshots contain a version of the target file.

The Dynamic Snapshot Links utilized by some embodiments of the present invention are an efficient way to provide the user a means for locating all snapshot versions of a file or to locate the most recent snapshot version. The use of dynamic snapshot links provide an advantage over the use of conventional file system links because conventional file system links, which are static, become obsolete and invalid as the new snapshots are created and old snapshots deleted.

Move-On-Write Data Capture Processing

Some embodiments of the present invention utilize the copy-on-write technique to more efficiently allocate and maintain snapshot datasets. The copy-on-write technique only copies the file system data that is modified into the snapshot file since unmodified data is not required to be copied. The use of copy-on-write updating techniques results snapshot datasets that "contain" data blocks stored both within a snapshot dataset as well as data blocks that are still part of the active file system. The data blocks within the snapshot datasets were copied or moved there as a result of the data in those blocks being modified. The exemplary embodiments of the present invention have snapshot datasets that reference data that is also within the original file if the original file data has not been modified since the creation of the snapshot.

Figure 13A:
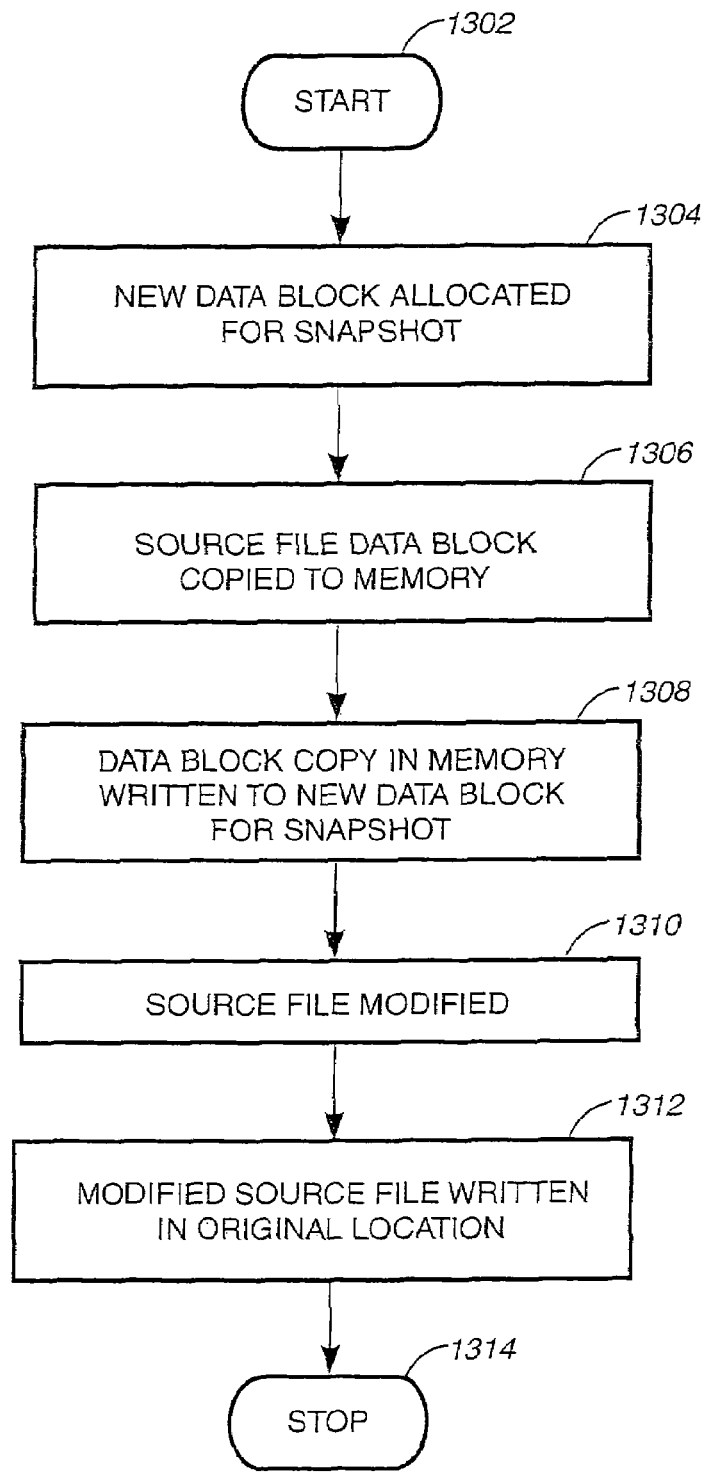
FIG. 13A is a flowchart depicting the operation and control flow of the copy-on-write process.

The copy-on-write processing control flow 1300 of an exemplary embodiment of the present invention is illustrated in FIG. 13A. Control flow 1300 begins with step 1302 and flows directly to step 1304. The processing of a copy-on-write operation utilized by this exemplary embodiment begins by allocating, at step 1304, the new data block that will be part of the snapshot dataset. The processing then copies, at step 1306, the data from the data block of the original file into a memory buffer. The copy of data within the memory buffer is then copied, at step 1308, into the new data block that was previously allocated. The processing then modifies the data, at step 1310, within the memory buffer and the modified data is written, at step 1312, to the original data file. Alternative embodiments of the present invention assign the new data buffer to the original data file and move the original data block, which is not changed, into the snapshot data set. This assignment of the original data block is performed by updating the block's pointer in the inode or an indirect block for the original file.

A second method utilized by other embodiments of the present invention is utilized if the entire data block is to be modified. This second method consists of moving the old block directly into the snapshot without reading its contents into the memory of the computer and without writing the data to a new location. After moving the old data block, a new, uninitialized block is assigned to the original file that is being modified. This method is referred to as a "move-on-write" operation and is substantially faster than a copy-on-write and also utilizes fewer computer resources.

In contrast to the copy-on-write operation, a move-on-write operation merely allocates a new block for the file and updates the block's pointer in the inode or indirect block of the original file. The old block is moved to the most recent snapshot replacing the ditto address stored there. Any earlier snapshots of the file may be left unchanged, since they previously referred to the original block and still do. A move-on-write avoids reading the contents of the original block and is a substantially faster operation than a copy-on-write.

The move-on-write method is used if the processing determines that the entire data storage block is to be modified. This move-on-write method is invoked the first time a data block in the original file is modified in order to preserve the original data for the snapshot dataset.

Figure 13B:
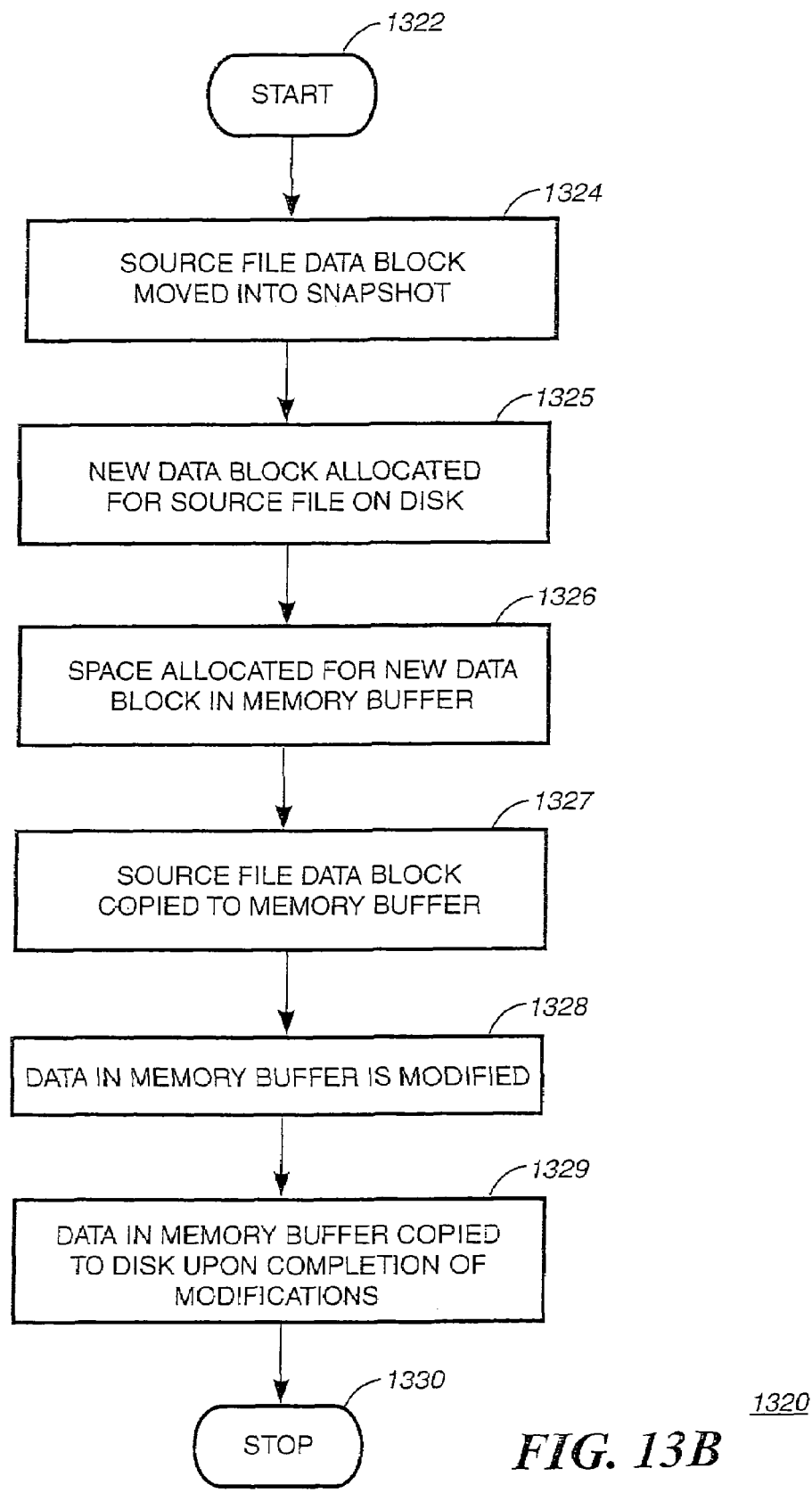
FIG. 13B is a flowchart depicting the operation and control flow of the move-on-write process, in one embodiment of the present invention.

The move on write processing control flow 1320 of an exemplary embodiment of the present invention is illustrated in FIG. 13B. Control flow 1320 begins with step 1322 and flows directly to step 1324. The processing starts by moving, at step 1324, the original data block, which is the data block originally contained within the source file being modified, into the snapshot dataset. This move is accomplished in this embodiment by updating the value of the disk address pointer within the inode stored in the snapshot dataset. After this disk block is moved into the snapshot dataset, the processing continues by allocating a new data block for the source file at step 1325. The processing then continues by allocating, at step 1325, space on the file system for the new data block and then allocating, at step 1326, a memory buffer for the new data block into which the updated data is to be temporarily stored. The memory buffer in the exemplary embodiments are initialized to zero, or otherwise marked, to indicate that none of the data in the memory block is valid. The source file data is then copied, at step 1327, into the memory buffer. The source file data stored within the memory buffer is then modified, at step 1328, while located within the memory buffer. The modified data is then copied, at step 1329, into the newly allocated data block.

Some embodiments of the present invention that implement the above version of the move-on-write operation do not employ this more efficient technique if the original data file is being written piecewise, i.e., one record at a time. In the case of piecewise writing of data, the first write to the original file appears to only modify a portion of the block. Because the file system processing cannot determine if additional writes to the same block are forthcoming, the file system in these embodiments acts conservatively and copies the original data into the snapshot using the more expensive copy-on-write method.

Some embodiments of the present invention utilize a variation of the copy-on-write/move-on-write method that is referred to herein as a deferred copy-on-write operation. This variation defers the copy-on-write operation when a file is being written in a piecemeal manner. The deferred copy-on-write operation often allows the file system to use the faster move-on-write operation rather than one or more copy-on-write operations.

The deferred copy-on-write operation of these embodiments operates upon modification of an original data file block. When the original data file block is first modified in exemplary embodiments that use the deferred copy-on-write operation, the original data file block is immediately moved into the snapshot dataset and a new, un-initialized block is assigned to the original file. The file system then records in a variable that is maintained by the file system of the exemplary embodiments that the copy-on-write operation for this modification of the data block has been deferred. The file system processing then writes the new data to the portion of the new block in which the new data is to be stored within the new data block, thereby resulting in valid data being stored in that portion of the new but otherwise un-initialized block. If subsequent writes to the new block validate that data block by writing valid data into the entire block, that entire block will then contain valid data and no copy-on-write operation is required. In these circumstances, the deferred copy-on-write operation advantageously obviates one or more iterations of the more expensive copy-on-write operation.

Embodiments that implement the deferred copy-on-write operation indicate that a particular block is in the middle of a deferred copy-on-write operation in a number of ways. Some embodiments of the present invention that implement deferred copy-on-write operations reserve a bit in the block's disk address to indicate if that block is in the middle of a deferred copy-on-write operation. If that bit is on, the block is in the middle of a deferred copy-on-write operation and reading data from that block requires further processing that possibly includes merging the data with the snapshot data. In addition to indicating whether each block is incomplete due to a deferred copy-on-write operation, the exemplary embodiment of the present invention also maintains a variable for each file that indicates if any data blocks within that file are in the process being updated with a deferred copy-on-write operation. This variable indicates that there is a lack of a complete source file data block, i.e., that there is at least one data block within the source file that is not complete. This variable allows more efficient data access by obviating a block by block determination that each data block is complete and valid.

Exemplary embodiments of file systems that implement deferred copy-on-write operations record which portions of the new block have been written and are therefore valid. The recording of which portions have been written is performed in some embodiments by tracking the exact byte changes within the block. Other embodiments, however, are designed to benefit from the heuristic observation that since files are typically written sequentially, it suffices to only defer the copy-on-write if the first byte in the block is being modified. The processing of these embodiments therefore only store the offset to the last byte modified. Additional processing efficiency is realized in some embodiments by observing that since files are typically written in their entirety, the file system is able to operate by only maintaining the ranges of valid information that are contained within a block only as long as that block is buffered in volatile memory. These embodiments then invoke a conventional copy-on-write operation or otherwise merge the data from the new buffer into the preexisting data block if the block has not been completely overwritten prior to writing the block to disk as part of disk caching operations. Other embodiments of the present invention store the valid range of data within a block as part of the file's inode, thereby supporting deferral of the copy-on-write until the block is actually read. It is clear that a range of implementations are possible.

If the file system processing requests reading of the block being processed by the deferred copy-on-write operation before the block contains entirely valid data, the file system detects that the block is in the middle of a deferred copy-on-write operation. In response to detecting that the block is not entirely valid, the file system processing in these embodiments reads the data that was saved in the original block and merges it with the new data written to the new block to satisfy the read request with the latest, valid data. This scenario results In less efficient operation when reading a data block that is in the middle of a deferred copy-on-write operation, but such a scenario is rare in system operations. Advantageously, most files are typically written sequentially and in their entirety. It is also observed that read requests that are issued concurrently with write requests are rare. Thus, this technique of deferring the copy-on-write operation substantially improves the overall efficiency of maintaining a file system snapshot.

The file system of the embodiments that perform a deferred copy-on-write operation handle requests to read data from a block that is in the middle of a deferred copy-on-write operation, i.e., prior to the complete writing of the block, in various ways. The processing of a request to read data that is wholly within a valid portion of the block, i.e., a portion of the new file data block to which new data has been written, retrieval of the data from the new data block proceeds with special processing. If a request to read data requests access to data that spans into an invalid range of the block, i.e., a range to which new data has not been written, or the request is for data that is wholly within an invalid range, the read operation then obtains some or all data from the original data block that was saved or moved into the snapshot. Although the file system may satisfy the read request without invoking the copy-on-write, the expense of the copy-on-write is in reading the original data into memory. Since this cost must be paid to satisfy the read request, the file system can perform the copy-on-write with relatively little additional work. Once the copy-on-write has completed, or when the entire block has been overwritten, the valid range information is discarded and the deferred copy-on-write cancelled allowing subsequent reads to proceed without intervention.

In embodiments that implement a deferred copy-on-write operation by storing partially complete blocks on the disk, e.g., unlike some of the embodiments discussed above that only defer the copy-on-write processing while the block is buffered in system memory, allow some of the data of the original file to reside only in a snapshot. This situation results if the original block is moved into the snapshot dataset, as described above, and the new data block that is now part of the original file has only the newly written data and the "old" data now only resides in the previous data block that has been moved into the snapshot. Such embodiments perform processing prior to deleting a snapshot (and potentially discarding the blocks stored in the snapshot) so as to perform the copy-on-write on all blocks that are still marked as requiring the deferred copy-on-write operation prior to deleting the snapshot. Embodiments, as are discussed above, that invoke the copy-on-write prior to flushing disk access memory buffers to disk when performing a deferred copy-on-write to disk are not subject to this situation and therefore snapshots in those embodiments are able to be deleted without checking the files in the active file system.

By taking advantage of typical access patterns to a file, the processing resource cost of a copy-on-write operation can be obviated in many cases. This substantially reduces the overhead to maintain a consistent snapshot of a file system.

Figure 13C:
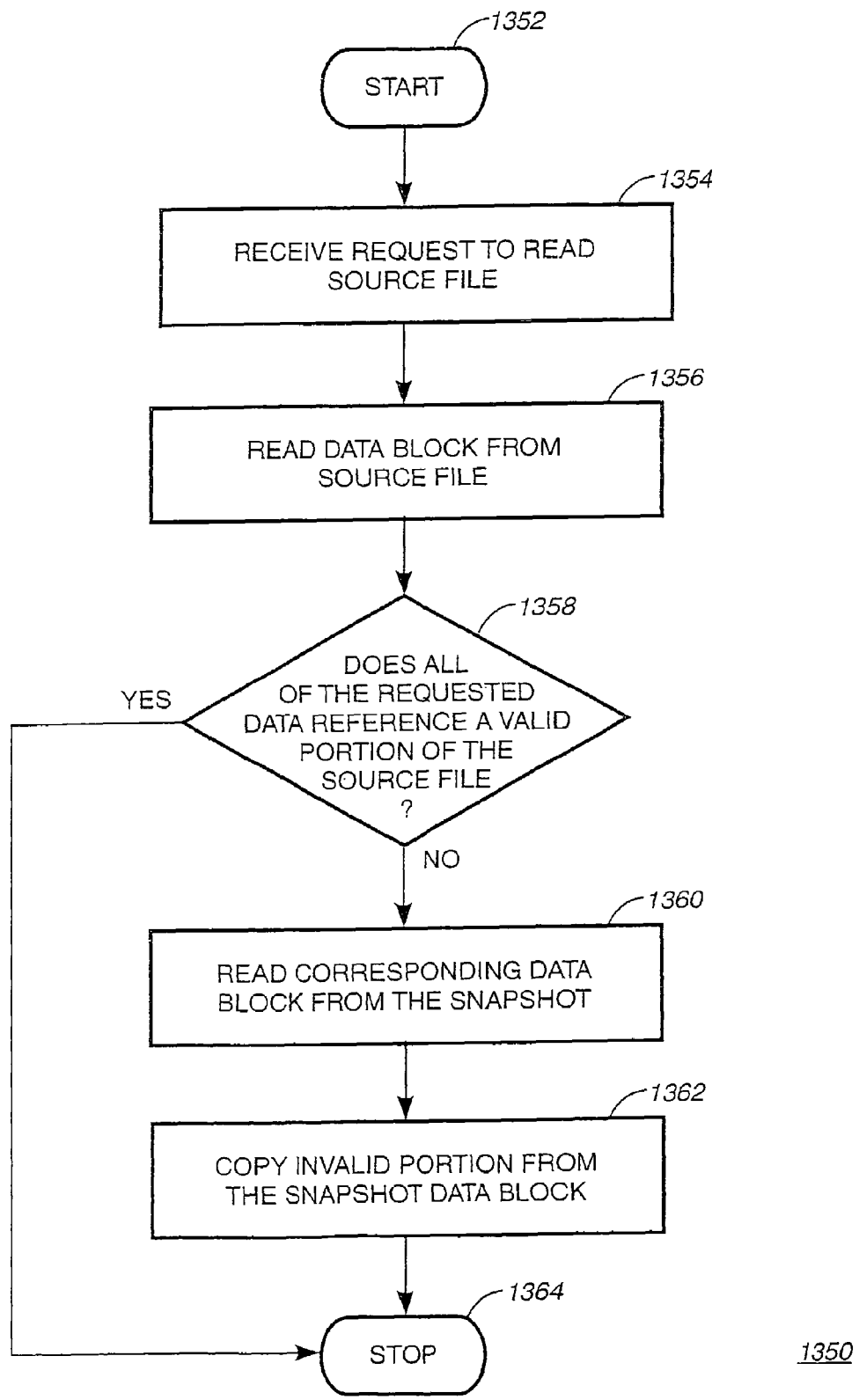
FIG. 13C is a flowchart depicting the operation and control flow of the read process after a move-on-write has occurred, in one embodiment of the present invention.

FIG. 13C is a flowchart depicting the operation and control flow 1350 of the read process after a move-on-write has occurred, in one embodiment of the present invention. Control flow 1350 begins with step 1352 and flows directly to step 1354. The processing starts by receiving, at step 1354, a request to read a source file which is currently in the process of a move-on-write. The exemplary processing then reads, at step 1356, the data block from the source file into a first memory buffer. The processing then proceeds to determine, at step 1358, whether all of the data requested by the read request is provided by storage reference to a valid portion of the source file data block based upon the update activity within that data block. If the requested data is within a valid portion of the data block of the source file, the process terminates, at step 1364, and the data within the first buffer is used. Otherwise, the process proceeds by reading, at step 1360, into a second buffer the data that corresponds to the requested data from the data block stored within the snapshot. The processing then copies, at step 1362, the data into the invalid portion of the first memory buffer from the data in the second memory buffer. Alternative embodiments do not use a second memory buffer and copy the invalid data directly from the snapshot data set into the first memory buffer.

Snapshot Sequences

The file systems in which the exemplary embodiments of the present invention capture snapshots are often shared among many users. These file systems contain numerous files that have different storage requirements. As a result, file system administrators often desire to make backups of files at different times and/or intervals. In order to support performing data backups at different times and/or intervals, some embodiments of the present invention create snapshots that selectively include only some of the files in the file system. For example, some users require more frequent backups than others. Other types of files are selected to not be included within a backup, and therefore a snapshot, because they are temporary files. Database files are sometimes selected to be excluded from a backup because the database application program has other means for data recovery and the file system administrator does not wish to incur the overhead of saving such database files into a snapshot. The capturing of multiple snapshot sequences that each capture only part of a file system allows different users to have different snapshot policies or to be entirely excluded from the snapshot mechanism.

Exemplary embodiments of the present invention allow creating and capturing snapshots of only part of the file system. These embodiments support partitioning the files in the file system such that only the files and directories within a given partition are included within a particular snapshot. These snapshots, which contain only a subset of the files in the file system, are herein referred to as snapshot sequences or SnapSequences. In the exemplary embodiments of the present invention, a file system is able to have any number of SnapSequences, but a single file is able to belong to only one SnapSequence, or no SnapSequence—in which case it is never included in a snapshot. The snapshot sequences in the exemplary embodiments that implement them are able to be arranged so that each SnapSequence creates, deletes or restores its own snapshots independently of the other sequences. SnapSequences in these embodiments are also able to be arranged hierarchically, such that a snapshot operation in a parent sequence also operates on each of its children.

Figure 14A:
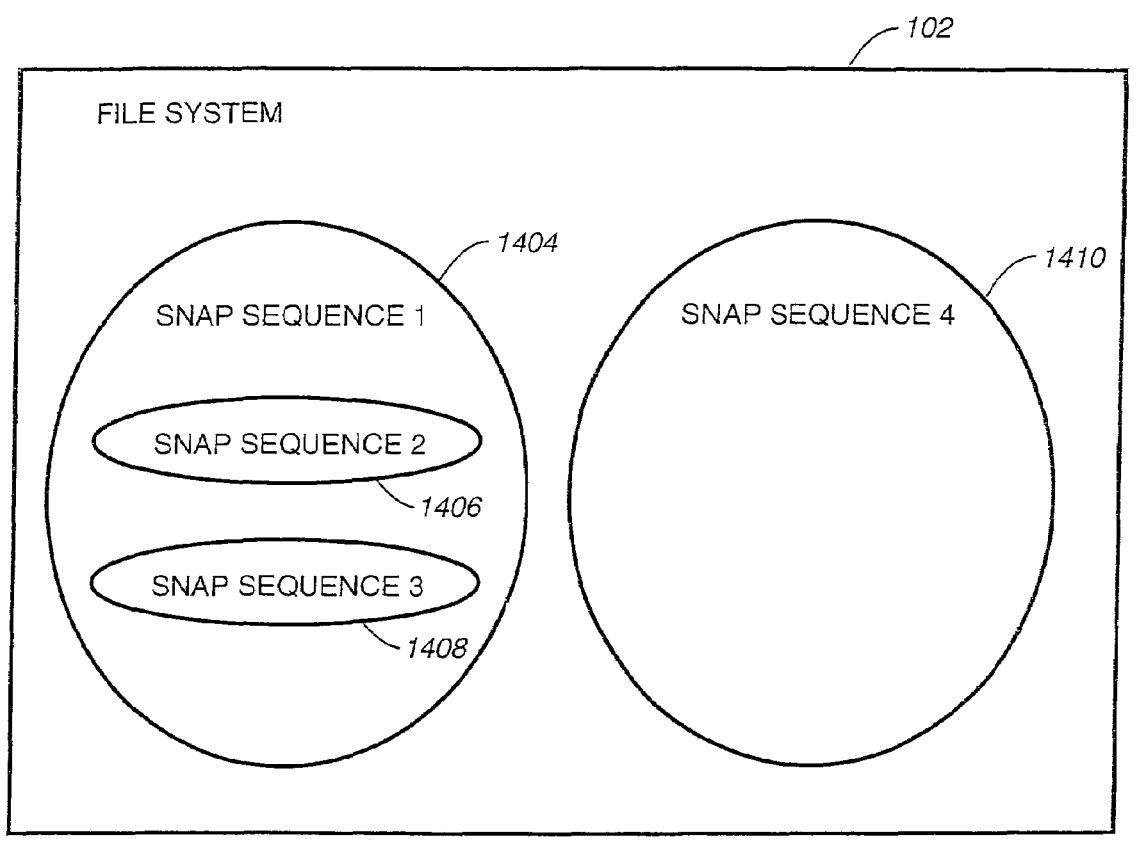
FIG. 14A is a Venn diagram depicting multiple snapshot sequences, in one embodiment of the present invention.

An exemplary snapshot sequence hierarchy for an exemplary embodiment of the present invention is illustrated in Venn diagram 1400 of FIG. 14A. The Venn diagram 1400 illustrates a file system 102 with two top level snapshot sequences, SnapSequence 1 1404 and SnapSequence 4 1410. Two child SnapSequences, SnapSequence 2 1406 and SnapSequence 3 1408, are also illustrated as being completely contained within SnapSequence 1 1404. To insure a consistent file system image, the hierarchies of these embodiments are strict and are not allowed to overlap.

Exemplary embodiments of the present invention that support snapshot sequences, or SnapSequences, identify each SnapSequence by a unique snapshot sequence identifier, referred to herein as its SnapSequenceId. The SnapSequenceId is used to identify the time that each snapshot was captured relative to other snapshots within a snapshot sequence. Each SnapSequence has its own MaxSnapId value that is equal to the largest snapshot identifier value that has been created in a particular sequence (i.e., it is the snapshot identifier of the most recently created snapshot in that sequence). MaxSnapId value is stored separately in the exemplary embodiments of the present invention in order to preserve the most recent snapshot identifier value in the case of deletion of the most recent snapshot. If the most recent snapshot of a snapshot sequence is deleted, the next snapshot in that sequence is assigned the next snapshot identifier after the MaxSnapId value in order to preserve snapshot identifier numbering and not reuse the snapshot identifier of the deleted snapshot. Each snapshot sequence also contains a list of available snapshots for that snapshot sequence. The file systems of embodiments that support SnapSequences store the SnapSequenceId and file snapshot identifier, referred to herein as FileSnapId, data field for that SnapSequence within the inode for the original file.

The exemplary embodiments of the present invention assign a file to a snapshot either via an explicit command or by inheriting the SnapSequenceId from a parent directory. The FileSnapId of a file is initialized to the MaxSnapId when that file is assigned to a snap sequence so as to cause that file to be included in all subsequent snapshots in that sequence. The file system of these embodiments compares the file's FileSnapId of a file to the MaxSnapId for the snapshot sequence to which that file is assigned when that file is modified in order to preserve the file's original contents in a snapshot for that sequence.

A new snapshot sequence is created via an explicit command in the exemplary embodiments of the present invention. Upon creation of a new snapshot sequence, the file system of the exemplary embodiments records the existence of the new snapshot sequence in the superblock of the file system, assigns a SnapSequenceId to the new snapshot sequence and initializes its value of MaxSnapId. If the new snapshot sequence is to be a child of another snapshot sequence, the parent is also specified. If no parent is specified for a snapshot sequence, the snapshot sequence is independent of the other snapshot sequences. The file system of the exemplary embodiments records the relationship between the snapshot sequences in the superblock so that later operations on a snapshot sequence include all of the children snapshot sequences as well. This linking of snapshot sequences in the superblock allows a file that is part of a child snapshot sequence to be included in the one or more parent snapshot sequences without maintaining copies of the file's data in both the child and parent snapshot sequences.

An example of parent and child snapshot sequences is a file system that has three users; Able, Baker and Charlie, and each of these three users have their own snapshot sequence. The file system administrator then defines a parent snapshot sequence labeled "Users" and assigns the snapshot sequences for Able and Baker as children of the Users snapshot sequence. A snapshot in the Users sequence of this example includes the snapshot sequence for Able and Baker, but not the snapshot sequence for Charlie.

Figure 14B:
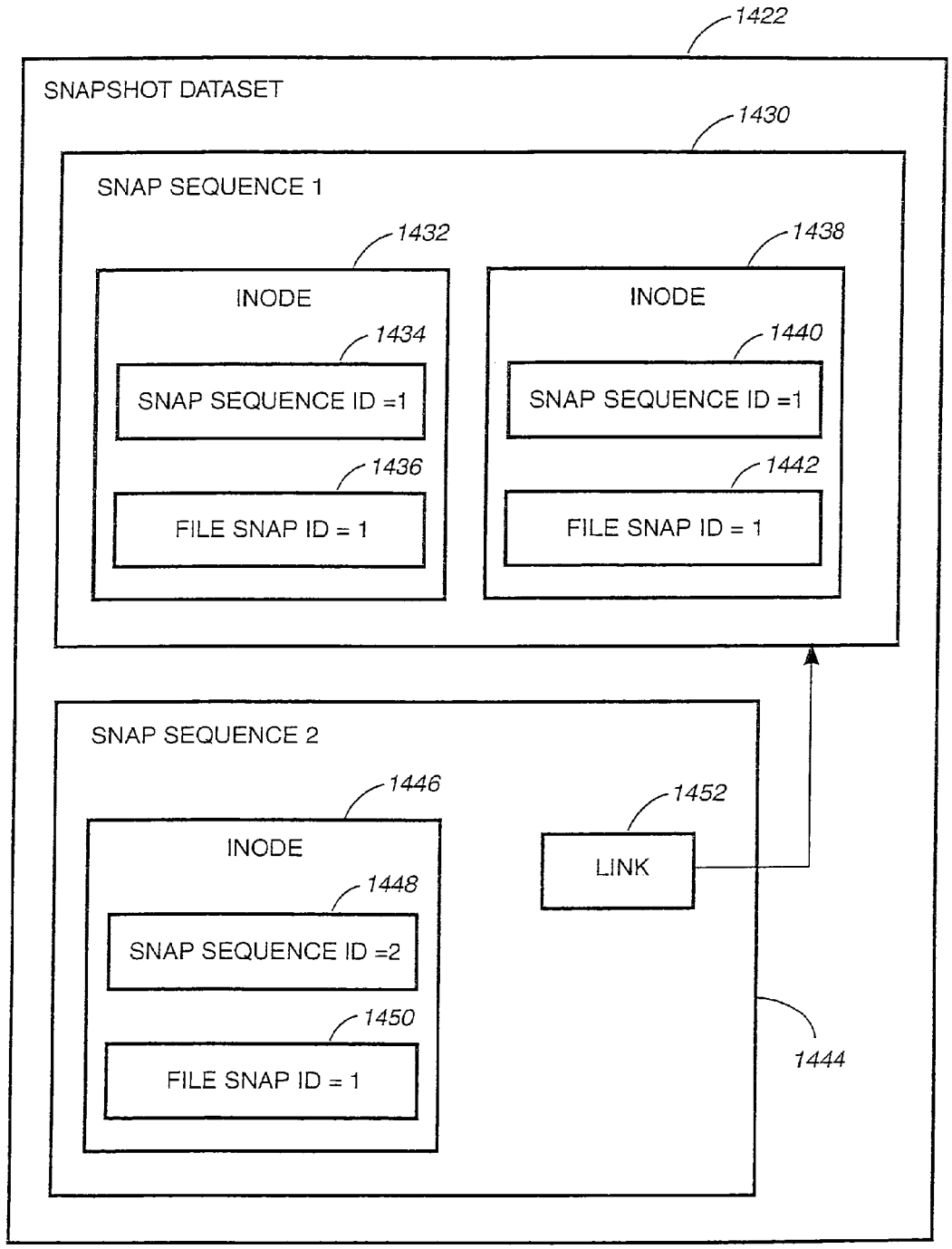
FIG. 14B is a block diagram depicting snapshot datasets associated with various snapshot sequences, in one embodiment of the present invention.

Data files that are included within a snapshot sequence have the SnapSequenceld and the FileSnapld values for that snapshot sequence stored in the inode for that data file. A block diagram illustrating exemplary inode data structures 1420 for files within parent and child snapshot sequences within an exemplary embodiment of the present invention is illustrated in FIG. 14B. The snapshot datasets 1422 of this example is illustrated as containing two snapshot sequences, SnapSequence 1 1430 and SnapSequence 2 1444. SnapSequence 2 1444 of this example is a child of SnapSequence 1 1430 as is described in the snapshot sequence data contained within the superblock for this file system.

SnapSequence 1 1430 in this illustration contains two data files, with inode 1 1432 and inode 2 1438. Each inode for the data files contains entries for the SnapSequences ld and FileSnapld. An example of these inodes is inode 1 1432 that has a first SnapSequenceld 1434 and a first FileSnapld 1436. The second inode 1438 also has second SnapSequenceld 1440 and second FileSnapld 1442. Each of the files within the first snapshot sequence have the value of SnapSequenceld set equal to one to indicate the snapshot sequence to which they belong. The child snapshot sequence, SnapSequence 2 1444, is shown in this example to have a single file with associated third inode 1446 that has a third SnapSequenceld 1448 and a third FileSnapld 1450. The SnapSequenceld 1448 in this example is set equal to two to indicate that this file belongs to the second snapshot sequence, SnapSequence 2 1444. The second snapshot sequence, SnapSequence 2 1444 also includes a parent link 1452 that references the parent snapshot sequence for that snapshot sequence.

Snapshot Creation within a Snapshot Sequence

Creating a snapshot within a snapshot sequence utilizes essentially the same processing as creating a standard snapshot. The MaxSnapld for the sequence is incremented and assigned to the new snapshot. An inode file for the new snapshot is created and the snapshot added to the list of available snapshots for that sequence in the superblock.

For snapshot sequences with children, the file system creates a new snapshot for each child using the same procedure. The child snapshots are linked to the parent snapshot to insure that the entire set is restored or deleted as a single unit.

Snapshot Deletion within a Snapshot Sequence

Deleting a snapshot from a snapshot sequence also deletes the corresponding snapshot from each of its children. The exemplary embodiments of the present invention delete the corresponding snapshot in a parent snapshot sequence when a snapshot in a child snapshot sequence is deleted in order to maintain a consistent file system.

Restoring a Snapshot within a Snapshot Sequence

The exemplary embodiments of the present invention restore a snapshot sequence to the file system by de-allocating all of the changed inodes and data blocks in the original file system and restoring the preserved values that are stored in the snapshot sequence. A snapshot sequence with children must also restore the corresponding snapshot sequences from each child.

It is possible that a snapshot sequence does not include all of the files that are present in the current file system. The original contents of a file (or directory) that are being modified are preserved in a snapshot in the inode within that snapshot that corresponds to the file being modified. Thus, a snapshot restore operation returns the inode to its preserved state. In the case of a preserved file that was deleted after the snapshot was created, the inode is no longer in use or is assigned to a different file or directory. Thus, the file system cannot automatically restore the preserved snapshot data. Since all of the files that are presently in the file system are not necessarily included in a snapshot sequence, exemplary embodiments that support snapshot sequences perform additional processing to maintain file consistency after restoring a file system from snapshot sequence.

Embodiments of the present invention that implement snapshot sequences traverse the snapshot being restored to determine which inodes that are saved in the snapshot belong to the snapshot sequence that is being restored. The file system restores the file to the same inode that is in the snapshot if the inode in the current file system belongs to the same sequence or another sequence in the snapshot sequence hierarchy that is being restored and if that inode is not in use by another file in the active file system. In the event, however, that the inode in the active file system is allocated to a file that is not in the snapshot sequence that is being restored, the file system relocates the restored file retrieved from the snapshot to an unallocated inode in the active file system. The file system of these embodiments preferably maintains a list of relocated files and a mapping of the original inode number to the reallocated inode number. When all the files have been restored from the snapshot, the file system then traverses the inode file for the active file system to locate all of the directories that belong to a restored sequence. Each restored directory is then scanned to locate directory entries for the files that were relocated upon being restored and directory entries are then updated to link to the relocated inode for files that were relocated upon restoration.

Figure 14C:
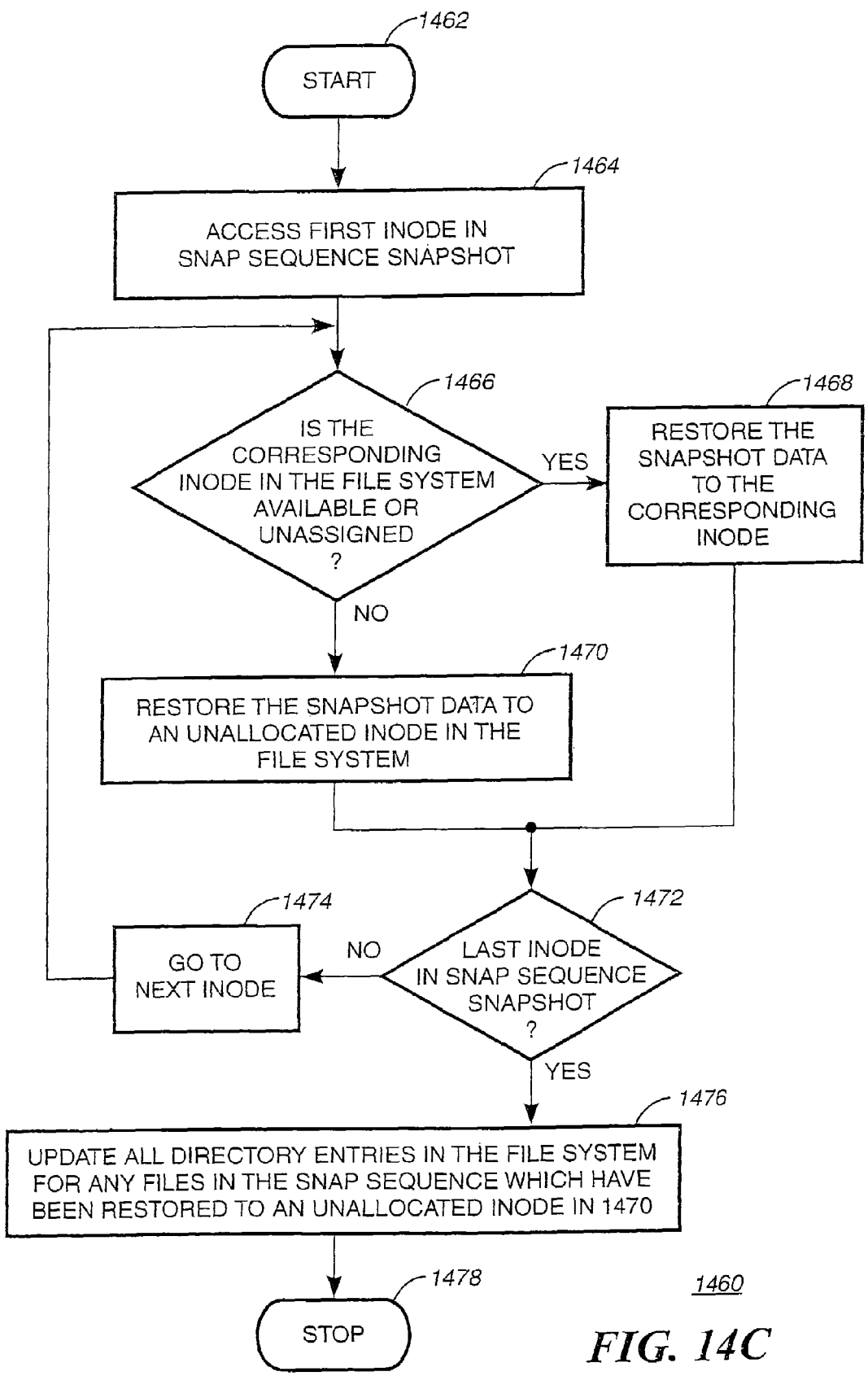
FIG. 14C is a flowchart depicting the operation and control flow of the restoration process when multiple snapshot sequences are available, in one embodiment of the present invention.

The snapshot sequence restoration processing that is used to restore data from a snapshot of an exemplary embodiment of the present invention is illustrated in control flow 1460 of FIG. 14C. Control flow 1460 begins with step 1462 and flows directly to step 1464. The exemplary snapshot sequence restoration processing begins by accessing, at step 1464, the first inode of the snapshot sequence. The processing then determines, at step 1466, whether the corresponding inode in the active file system is associated with a file that is in the SnapSequence being restored, is in any of the child snap sequences of the SnapSequence being restored or if the corresponding inode within the active file system is unassigned. If the corresponding inode in the active file system is determined to be part of the snapshot sequence being restored, to be part of a child snapshot sequence of the snapshot sequence being restored or to be unassigned, the snapshot data is restored, at step 1468, to the active file system using the corresponding inode for that file. If the inode for the file being restored is otherwise assigned, the processing restores, at step 1470, the snapshot data to an unallocated inode within the active file system.

Following restoration of the above inode to either the corresponding inode or an unassigned inode within the active file system, the processing determines, at step 1472, whether that inode is the last inode in the snapshot sequence. If that inode is not the last inode in the snapshot sequence, the processing continues by accessing, at step 1474, the next inode within the snapshot sequence. The processing of the next inode continues as described above for the previous inode, until the last inode is determined, at step 1472, to be processed.

After processing the last inode within the snapshot sequence being restored, the processing then updates the directory entries in the active file system that were relocated to unallocated inodes when restored, at step 1476, because their original inodes had been otherwise reallocated by the active file system. This updating involves relocation of the inodes from the unallocated inodes used during initial retrieval to the inodes that were used at the time the snapshot sequence was captured.

After completing the snapshot restore processing describe above, the file system of the exemplary embodiments returned to being consistently linked. Files that were relocated on the active file system during restoration have links in the restored directories also restored in order to correctly link the relocated file in the active file system. This processing preserves write consistency between files that are within the same snapshot sequence.

Figure 16:
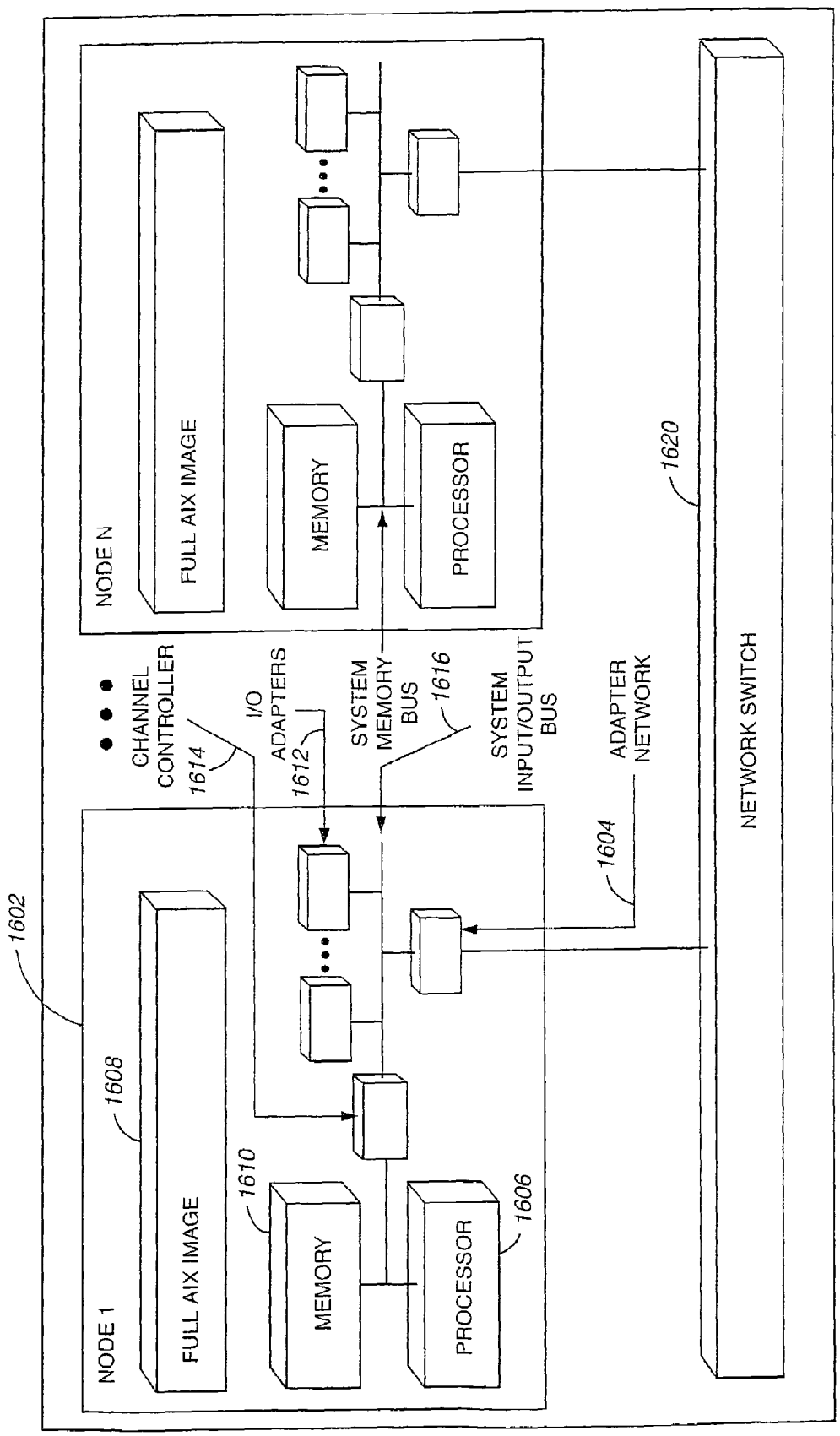
FIG. 16 is a block diagram of an exemplary multi-processor computer system useful for implementing the present invention.

Some of the exemplary embodiments of the present invention operate on distributed computing architectures. FIG. 16 illustrates a block diagram of a distributed computing environment 1600 that includes a plurality of nodes 1602 coupled to one another via a plurality of network adapters 1604. Each node 1602 is an independent computer with their own operating system image 1608, memory 1610 and processor(s) 1606 on a system memory bus 1618, a system input/output bus 1616 couples I/O adapters 1612 and network adapter 1604. Each network adapter is linked together via a network switch 1620. It is important to note that the network can be a fiber optic network with a corresponding fiber optic network switch.

In one example, distributed computing environment 1600 includes N nodes 1602 with one or more processors 1606. In one instance, each processing node is, a RISC/6000 computer running AIX, the IBM version of the UNIX operating system. The processing nodes do not have to be IBM RISC/6000 computers running the AIX operating system. Some or all of the processing nodes 1602 can include different types of computers and/or different operating systems 1608. All of these variations are considered a part of the claimed invention.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 17:
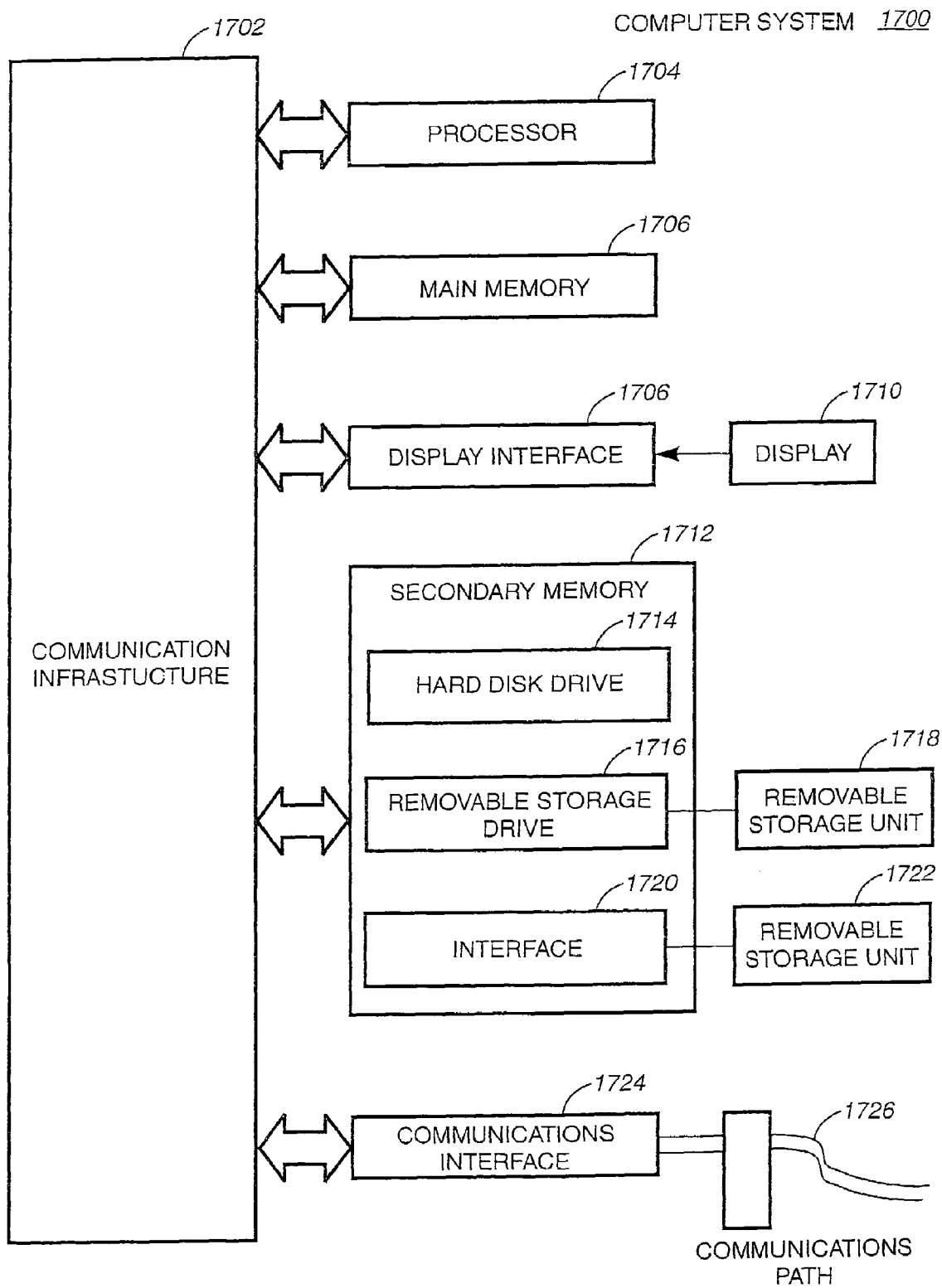
FIG. 17 is a block diagram of an exemplary computer system useful for implementing the present invention.

An example of a computer system 1700 is shown in FIG. 17. The computer system 1700 includes one or more processors, such as processor 1704. The processor 1704 is connected to a communication infrastructure 1702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Computer system 1700 can include a display interface 1708 that forwards graphics, text, and other data from the communication infrastructure 1702 (or from a frame buffer not shown) for display on the display unit 1710. Computer system 1700 also includes a main memory 1706, preferably random access memory (RAM), and may also include a secondary memory 1712. The secondary memory 1712 may include, for example, a hard disk drive 1714 and/or a removable storage drive 1716, representing a floppy disk drive, a magnetic tape drive, an optical disk drive, etc. The removable storage drive 1716 reads from and/or writes to a removable storage unit 1718 in a manner well known to those having ordinary skill in the art. Removable storage unit 1718, represents a floppy disk, magnetic tape, optical disk, etc. which is read by and written to by removable storage drive 1716. As will be appreciated, the removable storage unit 1718 includes a computer usable storage medium having stored therein computer software and/or data.

In alternative embodiments, the secondary memory 1712 may include other similar means for allowing computer programs or other instructions to be loaded into computer system 1700. Such means may include, for example, a removable storage unit 1722 and an interface 1720. Examples of such may include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1700.

Computer system 1700 may also include a communications interface 1724. Communications interface 1724 allows software and data to be transferred between computer system 1700 and external devices. Examples of communications interface 1724 may include a modem, a network interface (such as an Ethernet card), a communications port, a PCMCIA slot and card, etc. Software and data transferred via communications interface 1724 are in the form of signals which may be, for example, electronic, electromagnetic, optical, or other signals capable of being received by communications interface 1724. These signals are provided to communications interface 1724 via a communications path (i.e., channel) 1726. This channel 1726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1706 and secondary memory 1712, removable storage drive 1716, a hard disk installed in hard disk drive 1714, and signals. These computer program products are means for providing software to computer system 1700. The computer readable medium allows the computer system 1700 to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems 1700. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1706 and/or secondary memory 1712. Computer programs may also be received via communications interface 1724. Such computer programs, when executed, enable the computer system 1700 to perform the features of the present invention as discussed herein. In particular, the computer programs, when executed, enable the processor 1704 to perform the features of the computer system 1700. Accordingly, such computer programs represent controllers of the computer system 1700.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A system for generating snapshots, comprising:
 a memory:
 a processor communicatively coupled to the memory:
 an input interface, communicatively coupled to the memory and the processor, adapted to receive a first snapshot for a first plurality of source files in a file system, wherein the first snapshot comprises at least one invalid inode that contains an invalid disk address, wherein an invalid inode containing an invalid disk address indicates that metadata corresponding to the invalid inode is contained in one of a more recent snapshot and the source file system, and wherein the first plurality of source files comprises a subset of files within the file system that contains fewer than all of the files in the file system; and
 a storage, communicatively coupled to the memory, the processor and the input interface, the storage adapted to receive the first snapshot and store the first snapshot in response to the input interface receiving the first snapshot, the storage further adapted to store:
  a file snapshot identifier representing the subset of files comprising the first plurality of source files that are contained within the first snapshot, the file snapshot identifier stored within each inode corresponding to each of the first plurality of source files, and
  a snapshot sequence identifier associated with a time of the first snapshot, the snapshot sequence identifier stored within each inode corresponding to each of the first plurality of source files;
 a command interface adapted to accept a request for the first snapshot; and
 an output interface adapted to provide, in response to the command interface accepting the request, the first snapshot.

2. The system of claim 1, the storage further adapted to store a value equal to a value of at least one most recently stored snapshot sequence identifier.

3. The system of claim 1, the storage further adapted to store:
 a second snapshot for a second plurality of source files in a file system, wherein the second snapshot comprises at least one invalid inode that contains an invalid disk address, wherein an invalid inode containing an invalid disk address indicates that metadata corresponding to the invalid inode is contained in one of a more recent snapshot and the source file system;
 a second file snapshot identifier representing files comprising the second plurality of source files, the second file snapshot identifier stored within each inode corresponding to each of the second plurality of source files; and
 a second snapshot sequence identifier associated with the time of the second snapshot, the second snapshot sequence identifier stored within each inode corresponding to each of the second plurality of source files.

4. The system of claim 3, wherein at least some of the first plurality of source files and the second plurality of source files are not equivalent.

5. The system of claim 3, wherein the first plurality of source files is a subset of the second plurality of source files.

6. A computer implemented method for generating snapshots, the method comprising:
 receiving a first snapshot for a first plurality of source files in a file system, wherein the first snapshot comprises at least one invalid inode that contains an invalid disk address, wherein an invalid inode containing an invalid disk address indicates that metadata corresponding to the invalid inode is contained in one of a more recent snapshot and the source file system, and wherein the first plurality of source files comprises a subset of files within the file system that contains fewer than all of the files in the file system;
 storing the first snapshot into a storage;
 storing, into the storage, a file snapshot identifier representing the subset of files comprising the first plurality of source files that are contained within the first snapshot, the file snapshot identifier stored within each inode corresponding to each of the first plurality of source files;
 storing, into the storage, a snapshot sequence identifier associated with a time of the first snapshot, the snapshot sequence identifier stored within each inode corresponding to each of the first plurality of source files;
 accepting a request for the first snapshot; and
 providing, in response to accepting the request, the first snapshot.

7. The computer implemented method of claim 6, further comprising storing, in the storage, a value equal to a value of at least one most recently stored snapshot sequence identifier.

8. The computer implemented method of claim 6, further comprising:
   storing, into the storage, a second snapshot for a second plurality of source files in a file system, wherein the second snapshot comprises at least one invalid inode that contains an invalid disk address, wherein an invalid inode containing an invalid disk address indicates that metadata corresponding to the invalid inode is contained in one of a more recent snapshot and the source file system;
   storing, into the storage, a second file snapshot identifier representing files comprising the second plurality of source files, the second file snapshot identifier stored within each inode corresponding to each of the second plurality of source files; and
   storing, into the storage, a second snapshot sequence identifier associated with the time of the second snapshot, the second snapshot sequence identifier stored within each inode corresponding to each of the second plurality of source files.

9. The computer implemented method of claim 8, wherein at least some of the first plurality of source files and the second plurality of source files are not equivalent.

10. The computer implemented method system of claim 8, wherein the first plurality of source files is a subset of the second plurality of source files.

11. A computer program product for generating snapshots, the computer program comprising:
   a storage medium readable by a processing circuit and storing instructions for execution by the processing circuit for performing a method comprising:
   receiving a first snapshot for a first plurality of source files in a file system, wherein the first snapshot comprises at least one invalid inode that contains an invalid disk address, wherein an invalid inode containing an invalid disk address indicates that metadata corresponding to the invalid inode is contained in one of a more recent snapshot and the source file system, and wherein the first plurality of source files comprises a subset of files within the file system that contains fewer than all of the files in the file system;
   storing the first snapshot into a storage;
   storing, into the storage, a file snapshot identifier representing the subset of files comprising the first plurality of source files that are contained within the first snapshot, the file snapshot identifier stored within each inode corresponding to each of the first plurality of source files;
   storing, into the storage, a snapshot sequence identifier associated with a time of the first snapshot, the snapshot sequence identifier stored within each inode corresponding to each of the first plurality of source files;
   accepting a request for the first snapshot; and
   providing, in response to accepting the request, the first snapshot.

12. The computer readable medium of claim 11, the computer instructions further comprising instructions for storing, into the storage, a value equal to a value of at least one most recently stored snapshot sequence identifier.

13. The computer readable medium of claim 11, the computer instructions further comprising instructions for:
   storing, into the storage, a second snapshot for a second plurality of source files in a file system, wherein the second snapshot comprises at least one invalid inode that contains an invalid disk address, wherein an invalid inode containing an invalid disk address indicates that metadata corresponding to the invalid inode is contained in one of a more recent snapshot and the source file system;
   storing, into the storage, a second file snapshot identifier associated with the second plurality of source files, the second file snapshot identifier stored within each inode corresponding to each of the second plurality of source files; and
   storing, into the storage, a second snapshot sequence identifier associated with the time of the second snapshot, the second snapshot sequence identifier stored within each inode corresponding to each of the second plurality of source files.

14. The computer readable medium of claim 13, wherein at least some of the first plurality of source files and the second plurality of source files are not equivalent.

15. The computer readable medium of claim 13, wherein the first plurality of source files is a subset of the second plurality of source files.

* * * * *